(12) United States Patent
Sameer et al.

(10) Patent No.: US 11,869,246 B2
(45) Date of Patent: Jan. 9, 2024

(54) METHOD AND APPARATUS FOR CROWD CONTROL MAPS

(71) Applicant: HERE Global B.V., Eindhoven (NL)

(72) Inventors: Priyank Sameer, Mumbai Maharashtra (IN); Suresh Ningthoujam, Thane Maharashtra (IN)

(73) Assignee: HERE GLOBAL B.V., Eindhoven (NL)

( * ) Notice: Subject to any disclaimer, the term of this patent is extended or adjusted under 35 U.S.C. 154(b) by 288 days.

(21) Appl. No.: 17/476,124

(22) Filed: Sep. 15, 2021

(65) Prior Publication Data

US 2023/0085346 A1    Mar. 16, 2023

(51) Int. Cl.
*G06V 20/52* (2022.01)
*G06T 17/05* (2011.01)
*H04W 4/02* (2018.01)
*G06F 16/29* (2019.01)
*H04W 4/021* (2018.01)

(52) U.S. Cl.
CPC .............. *G06V 20/53* (2022.01); *G06F 16/29* (2019.01); *G06T 17/05* (2013.01); *H04W 4/021* (2013.01); *H04W 4/023* (2013.01); *G06V 2201/07* (2022.01)

(58) Field of Classification Search
CPC ........ G06V 20/53; G06V 20/52; G06V 20/58; G06V 10/70; G06V 10/768; G06V 2201/07; H04W 4/02; H04W 4/021; H04W 4/023; G06F 16/29; G06T 17/05
See application file for complete search history.

(56) References Cited

U.S. PATENT DOCUMENTS

| | | | | |
|---|---|---|---|---|
| 7,483,917 | B2* | 1/2009 | Sullivan | G06F 16/29 |
| | | | | 707/999.102 |
| 8,195,598 | B2* | 6/2012 | Hua | G06N 5/02 |
| | | | | 706/62 |
| 2019/0104596 | A1* | 4/2019 | Den Hartog | H05B 47/12 |
| 2020/0202139 | A1* | 6/2020 | Ikeda | G06F 18/2155 |
| 2021/0097298 | A1* | 4/2021 | Xu | G06V 10/82 |
| 2022/0012477 | A1* | 1/2022 | Ikeda | G06V 10/82 |
| 2022/0254161 | A1* | 8/2022 | Tatrai | G06T 7/70 |

FOREIGN PATENT DOCUMENTS

| | | | | |
|---|---|---|---|---|
| CN | 112101781 | A | 12/2020 | |
| CN | 110781853 | B | * 12/2022 | G06K 9/00778 |

OTHER PUBLICATIONS

Ali et al., "In-Depth Survey to Detect, Monitor and Manage Crowd", IEEE (Year: 2020).*

(Continued)

*Primary Examiner* — Dung Hong

(57) ABSTRACT

An approach is disclosed for detecting cornering spots capable of facilitating crowd control by limiting a mobility of a crowd. The approach involves, for example, collecting satellite, aerial, and/or street-level imagery associated with one or more geographic features of a geographic area. The approach also involves determining at least one cornering spot along with one or more attributes of the cornering spot characterizing the effectiveness of the cornering spot to assist in crowd control. Cornering spot data can be stored in a geographic database and/or displayed in an application on user equipment.

20 Claims, 12 Drawing Sheets

(56) References Cited

OTHER PUBLICATIONS

Franke et al., "Smart Crowds in Smart Cities: Real Life, City Scale Deployments of a Smartphone Based Participatory Crowd Management Platform", Journal of Internet Services and Applications, Article No. 27, Dec. 22, 2015, 19 pages.

"Crowd and Capacity Monitoring", The MONICA Project, retrieved on Aug. 4, 2021 from https://www.monica-project.eu/portfolio-items/crowd-and-capacity-monitoring/, 26 pages.

Sirmacek et al., "Automatic Crowd Analysis from Very High Resolution Satellite Images", ISPRS—International Archives of the Photogrammetry Remote Sensing and Spatial Information Sciences, Oct. 2011, 6 pages.

* cited by examiner

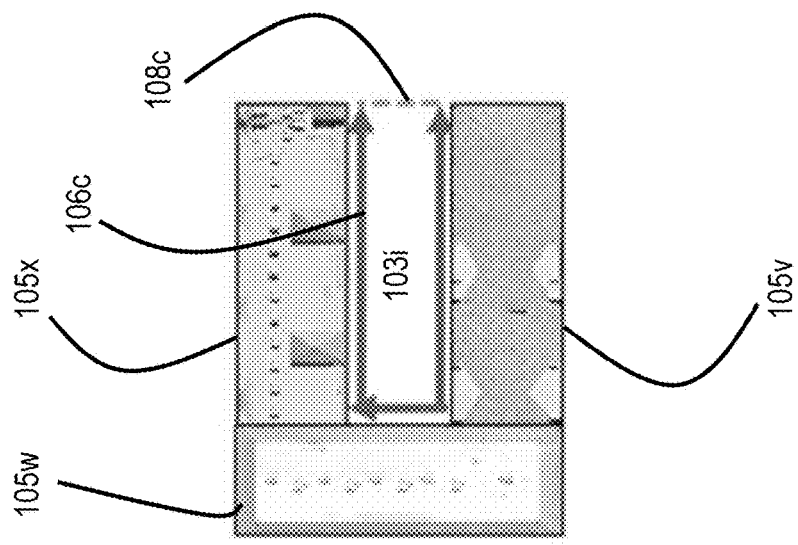
FIG. 1G  FIG. 1H  FIG. 1I
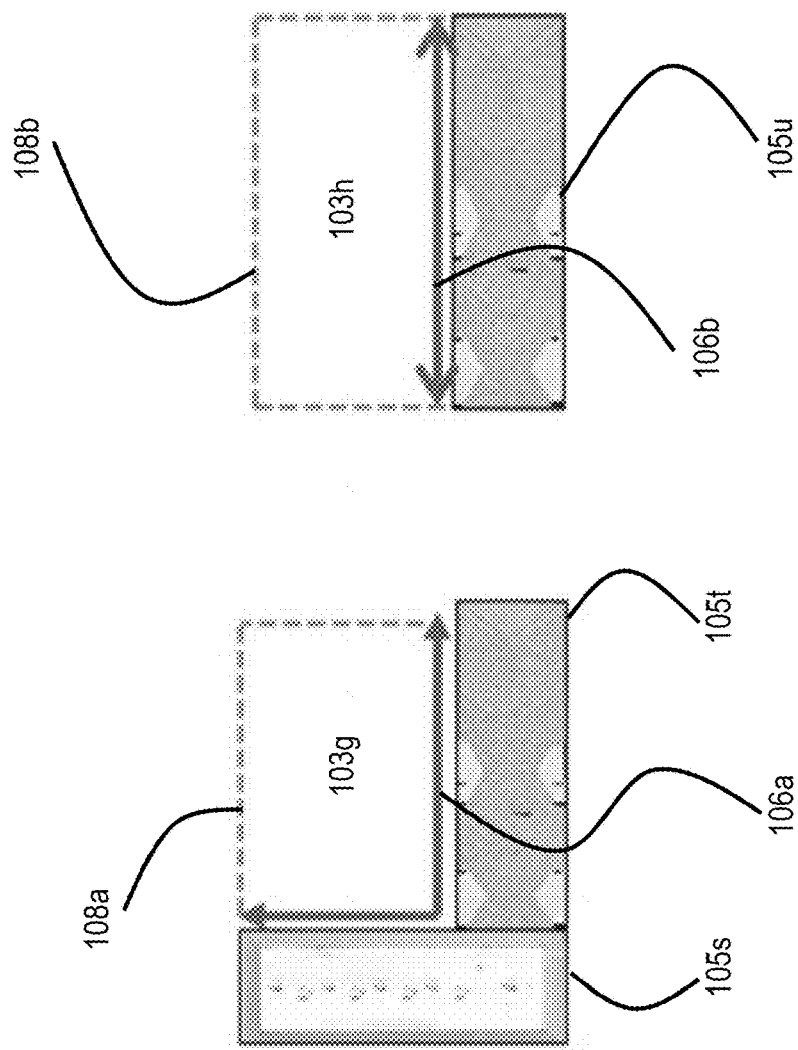

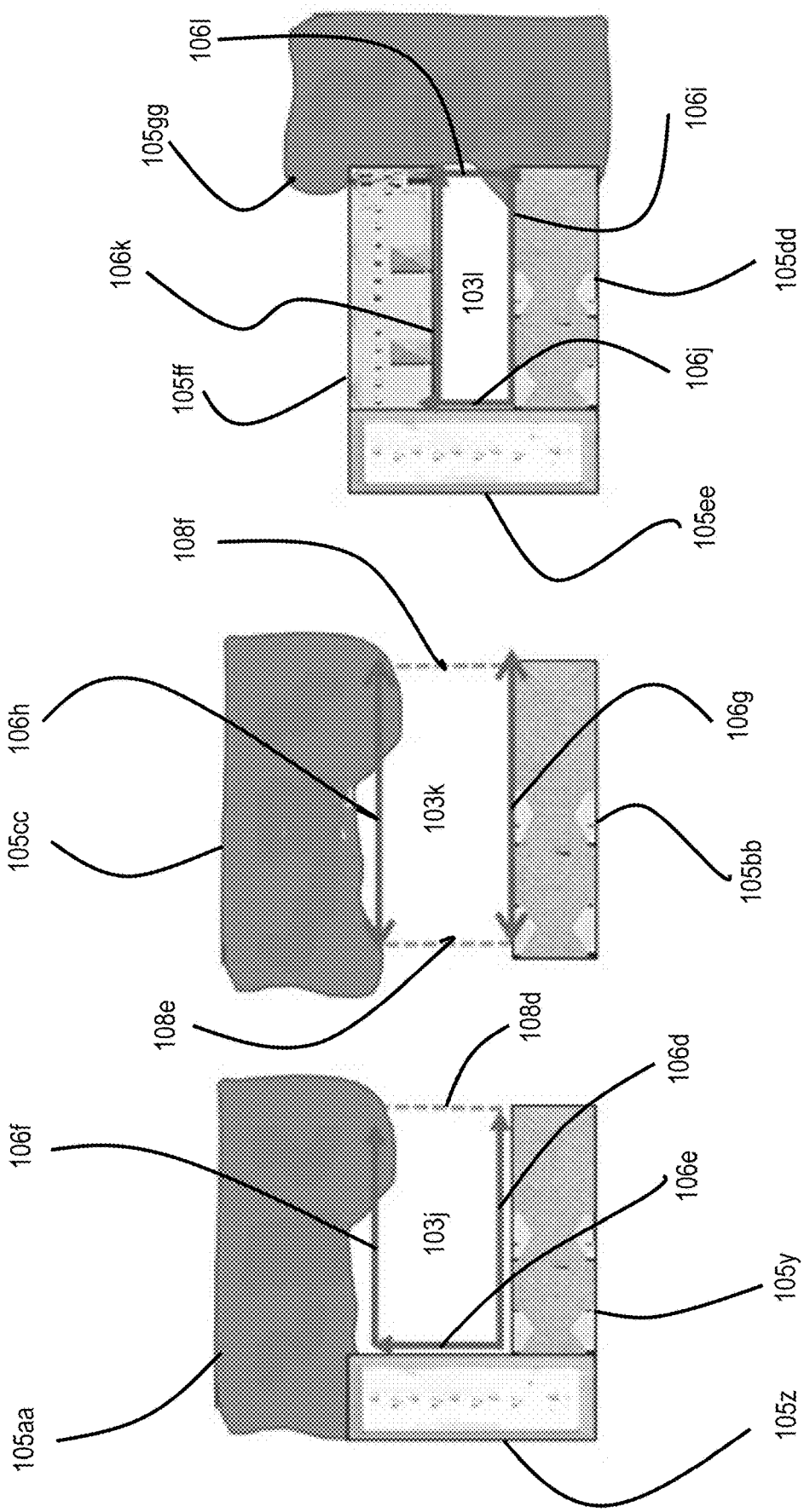

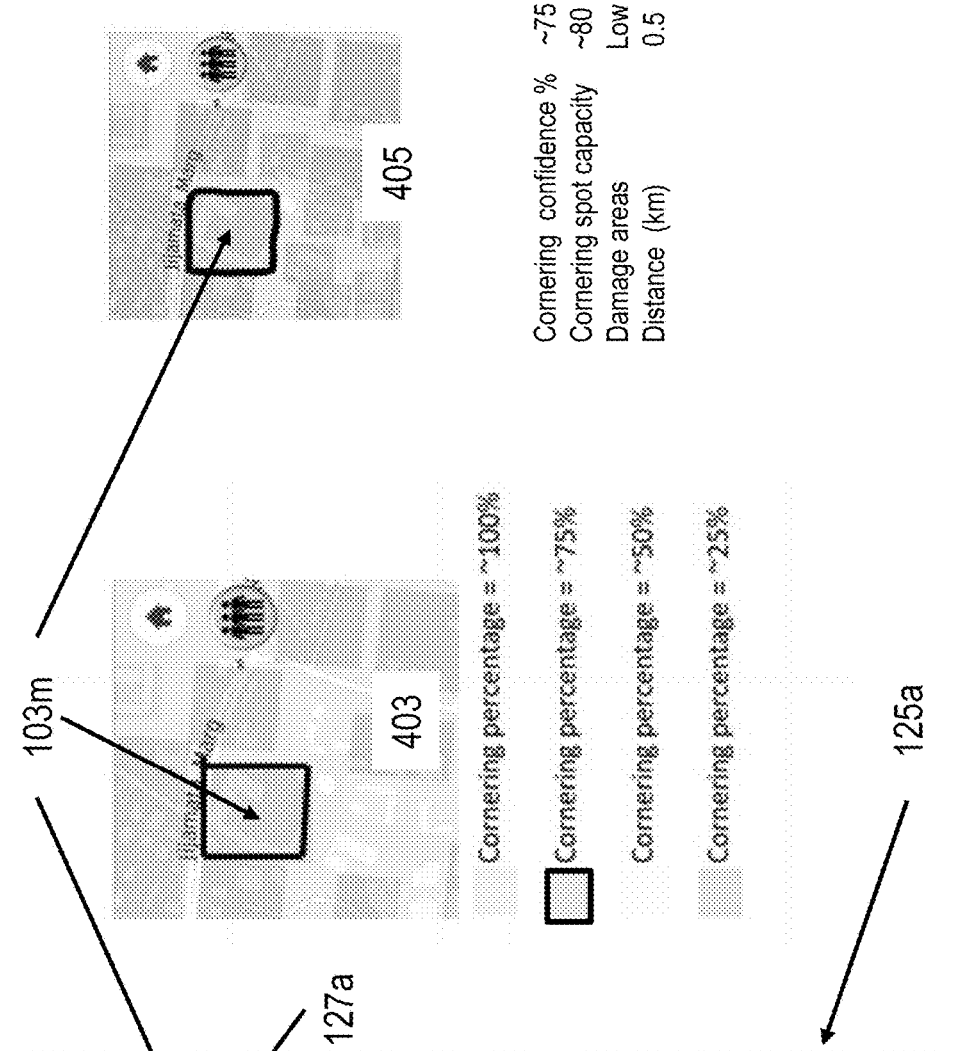
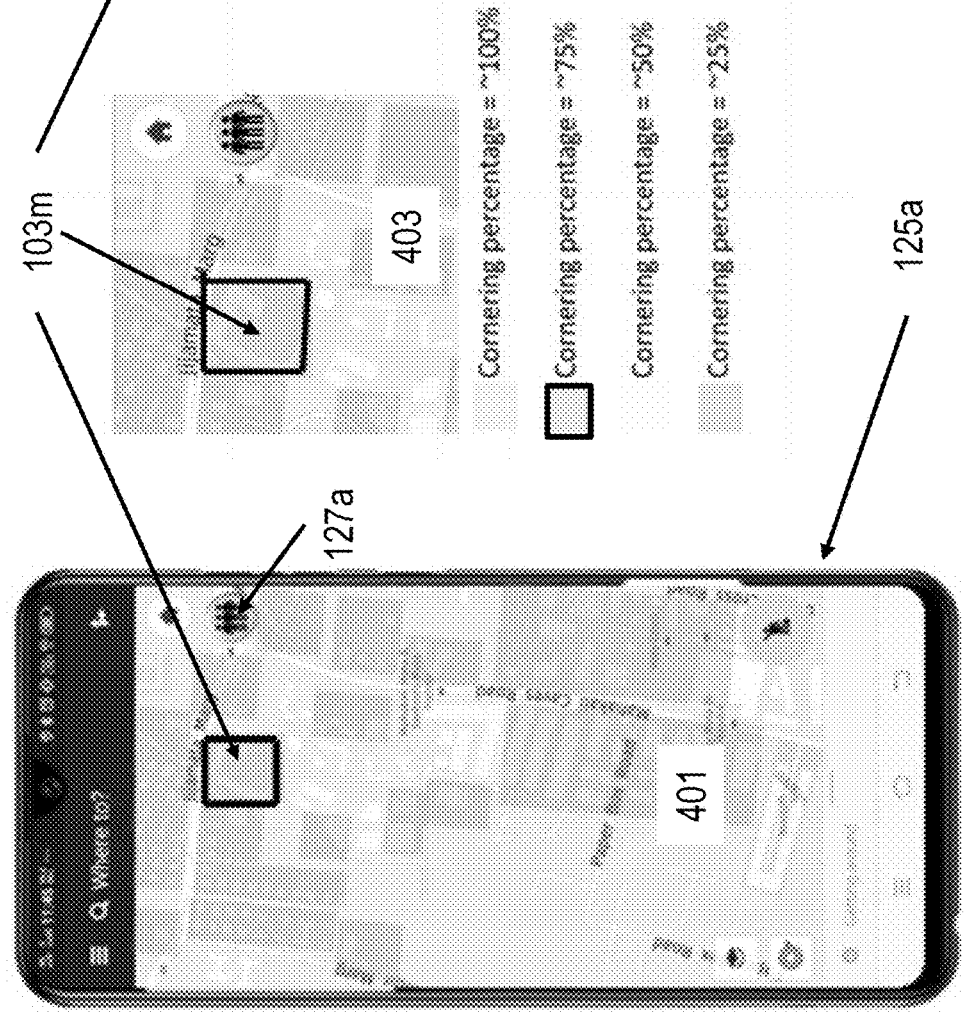
FIG. 4A CORNERING SPOT IDENTIFICATION
FIG. 4B CORNERING SPOT RANKING
FIG. 4C CORNERING SPOT ATTRIBUTES

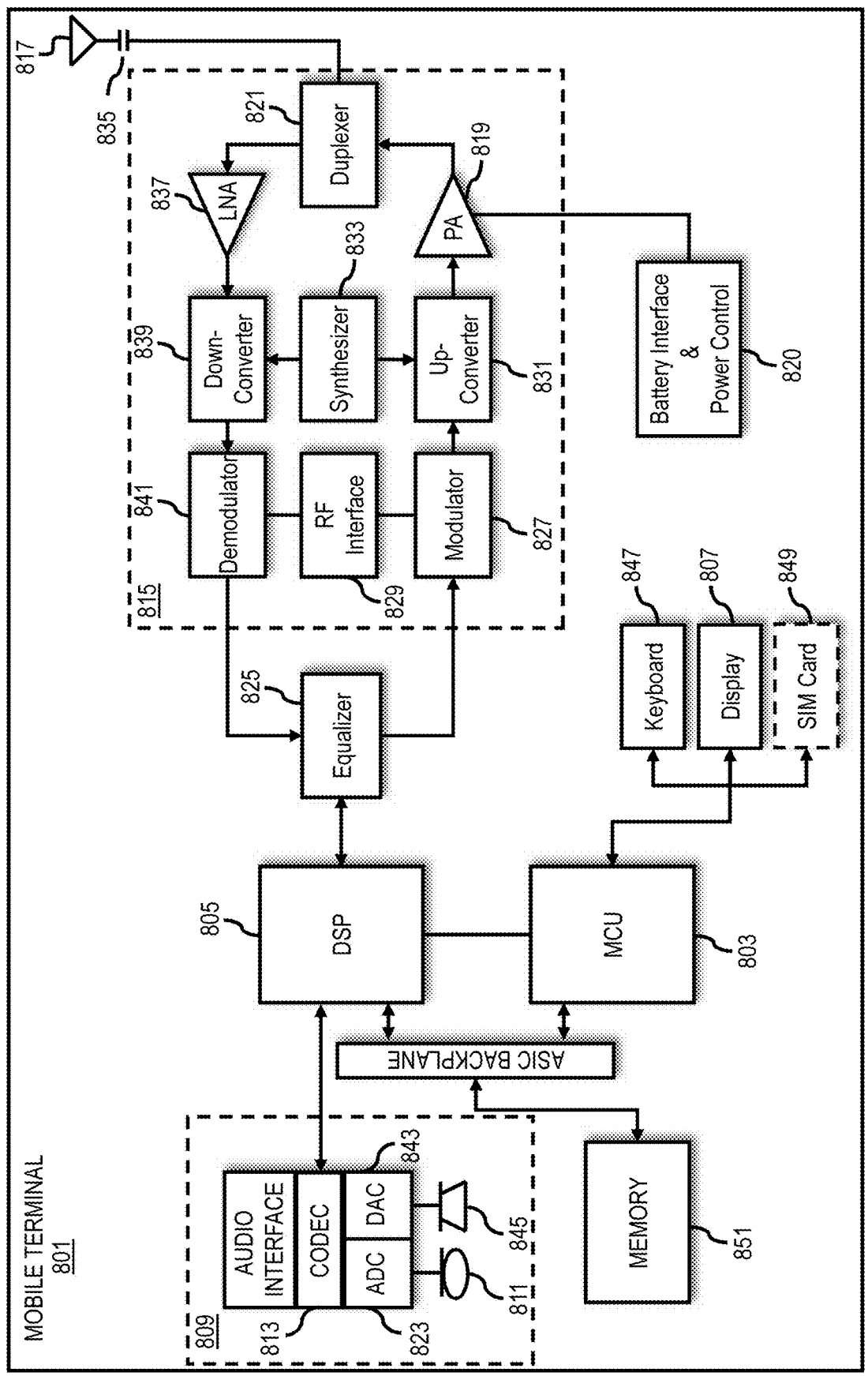

METHOD AND APPARATUS FOR CROWD CONTROL MAPS

BACKGROUND

Location-based service providers (e.g., mapping and navigation providers) are continually challenged to provide compelling services and applications. One area of interest relates to developing tools to assist government or other authorities in crowd management. Imagery data, such as aerial, satellite, and/or street-level imagery, permits passive monitoring of when and where crowd may form, the size of a crowd, and the movement of a crowd. Depending on the motivation behind formation of a crowd, there exists a risk of bodily injuries and/or property damage at the location of a static crowd or along the pathway of a crowd in motion. Accordingly, service providers face significant technical challenges to provide more proactive crowd management.

SOME EXAMPLE EMBODIMENTS

Therefore, there is a need for an approach for processing imagery data to assist in crowd control, e.g., for the purpose of mitigating injuries to people (either in the crowd, involved in managing the crowd, or innocent bystanders) and/or damage to property.

According to one embodiment, a method comprises processing imagery data to detect a cornering spot, wherein the cornering spot is an open geographic area that is enclosed, at least in part, by one or more geographic features capable of facilitating crowd control by limiting a mobility of a crowd. The method also comprises storing the cornering spot as a data record of a geographic database. The method further comprises providing the cornering spot as an output of the geographic database.

According to another embodiment, an apparatus comprising at least one processor, and at least one memory including computer program code, the at least one memory and the computer program code configured to, with the at least one processor, cause the apparatus to process imagery data to detect a cornering spot, wherein the cornering spot is an open geographic area that is enclosed, at least in part, by one or more geographic features capable of facilitating crowd control by limiting a mobility of a crowd. The apparatus is also caused to store the cornering spot as a data record of a geographic database. The apparatus is further caused to provide the cornering spot as an output of the geographic database.

According to another embodiment, a computer-readable storage medium carrying one or more sequences of one or more instructions which, when executed by one or more processors, cause an apparatus to process imagery data to detect a cornering spot, wherein the cornering spot is an open geographic area that is enclosed, at least in part, by one or more geographic features capable of facilitating crowd control by limiting a mobility of a crowd. The apparatus is also caused to store the cornering spot as a data record of a geographic database. The apparatus is further caused to provide the cornering spot as an output of the geographic database.

According to another embodiment, an apparatus comprises means for processing imagery data to detect a cornering spot, wherein the cornering spot is an open geographic area that is enclosed, at least in part, by one or more geographic features capable of facilitating crowd control by limiting a mobility of a crowd. The method also comprises storing the cornering spot as a data record of a geographic database. The method further comprises providing the cornering spot as an output of the geographic database.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1B-1L are diagrams illustrating configurations of cornering spots and geographic features and their related attributes, according to exemplary embodiments;

FIGS. 4A-4C are diagrams of user interfaces utilized in the processes of FIG. 3, according to various embodiments;

FIG. 8 is a diagram of a mobile station (e.g., handset) that can be used to implement an embodiment.

DESCRIPTION OF PREFERRED EMBODIMENT

Figure 1A:
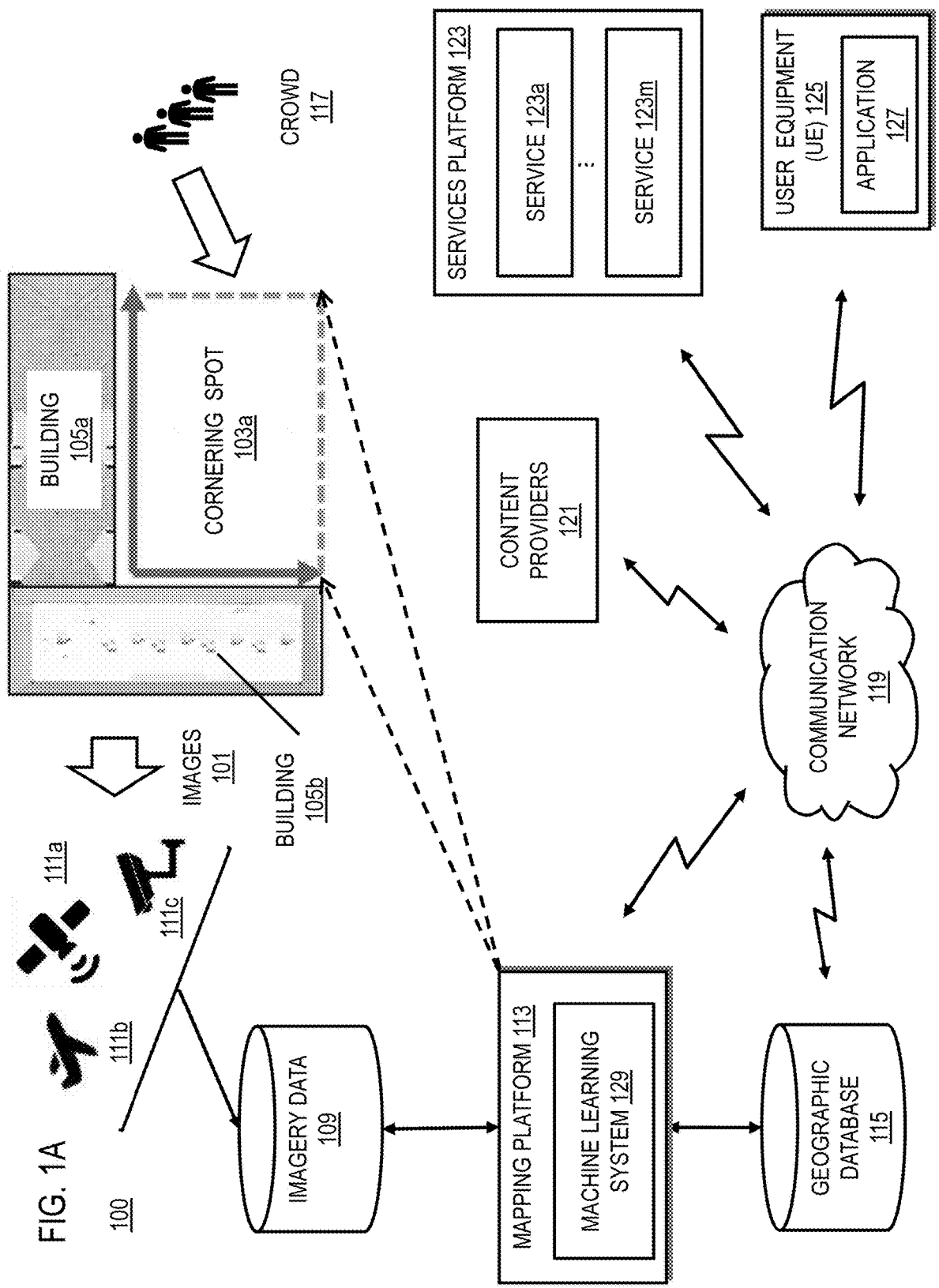
FIG. 1A is a diagram of a system capable of identifying cornering spots suited for controlling a crowd, according to one embodiment.

A method and apparatus for capable of identifying cornering spots suited for controlling a crowd are disclosed herein. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "cornering spot" refers to a place or situation from which it is hard for a crowd (e.g., of people, animals, vehicles, or other movable entities/objects) to escape. In one embodiment, a cornering spot is an open geographic area that is enclosed, at least in part, by one or more geographic features capable of facilitating crowd control by limiting a mobility of a crowd. The crowd, for instance, can be cornered or otherwise contained in the open geographic area of the cornering spot. The one or more geographic features (e.g., buildings, structures, terrain features, etc.) adjacent to the perimeter of the cornering spot can assist in limiting the crowd from escaping or moving out of the open geographic area. Accordingly, cornering spots advantageously can enable using less crowd control resource than would be required for containing a crowd of the same size in an equivalent open geographic area lacking one or more geographic features adjacent to its perimeter. In other words, the one or more geographic features (including, but not limited to, a building, a wall, hills, bodies of water, or other physical barriers) are capable of limiting the mobility of the crowd by either preventing escape from the cornering spot by one or more members of the crowd or limiting the pace at which one or more members of the crowd could escape from the cornering spot. Cornering spots exemplified herein are shown as rectangular areas to simplify illustration of the concept or cornering spots. Although some real situations might be this simple, cornering spots in practice can be an open geometric area of any geometric shape with a fully enclosed perimeter.

As used herein, the term "cornering confidence percentage" refers to an attribute of a cornering spot. Generally, more open space or spaces around the perimeter of the open geographic area of a cornering spot provide greater opportunity for members of a crowd that has been cornered in the cornering spot to leave the cornering spot, thus leading to a lower cornering confidence percentage. Conversely, cornering spots having more buildings and/or other geographic features adjacent to the perimeter of the open geographic area of a cornering spot present barriers to block members of a cornered crowd from leaving the cornering spot, thus leading to a higher cornering confidence percentage. Cornering confidence percentage is explained herein based on geographic features and open spaces around the perimeter of rectangular areas to simplify illustration of the concept or cornering confidence percentage. Although some real situations might be this simple, cornering confidence percentage in practice can be based on cornering spots having open geometric area of any geometric shape with a fully enclosed perimeter, thus requiring more complicated calculation methods.

As used herein, the term "cornering spot capacity" refers to an attribute of a cornering spot. Generally, corning spot capacity means that crowd size that can be contained in a cornering spot. In some embodiments, cornering spot capacity could be more refined in considering other factors including, but not limited to, nature of the crowd (violent or peaceful), density of the crowd within a given geographic area, weather, time of day, and/or amount of time that the crowd must be contained. In some embodiments, a cornering spot capacity is an upper limit in that attempting to contain a larger crowd than the upper limit would tend to increase the risk of property damage and/or injuries to members of the crowd. In some embodiments, a capacity can also have a lower limit in that a small enough crowd in a large enough open geographic area might require an inordinate amount of crowd control resource relative to the size of the crowd, since containment of a small crowd would still require enough crowd control resource to cover the open portion of the perimeter of the open geographic area of a cornering spot between geographic features. In some embodiments, crowd capacity is based on a crowd density such as a minimum and maximum number of people per 100 square feet.

As used herein, the term "crowd control resource requirement" refers the predicted amount of resources, such as, but not limited to, police, military, governmental officials or personnel, or other authorized personnel, required to control and/or contain a crowd within a selected cornering spot. Generally, the crowd control resource requirement can be based on cornering confidence percentage and/or cornering spot capacity. With other cornering spot attributes held constant, crowd control resource requirement increases as cornering spot capacity increases and decreases as cornering spot capacity decreases. With other cornering spot attributes held constant, crowd control resource requirement increases as cornering confidence percentage decreases and decreases as cornering confidence percentage increases.

As used herein, the term "enclosed percentage" is closely related to the cornering confidence percentage. In some embodiments, the enclosed percentage is an estimate of the effectiveness of an individual geographic feature for prevention members of the crowd from escaping the geographic open area of a cornering spot. For example, a wood fence 6 feet in height would have a higher enclosed percentage than a wood fence 3 feet in height, since the fence 6 feet in height would be more difficult to surmount than the fence 3 feet in height. A brick wall 10 feet in height would have a higher enclosed percentage than a wood fence 5 feet in height, since the brick wall would be more difficult to surmount than the fence. A building would have a higher enclosed percentage than a brick wall 10 feet in height, since the fence building would be more difficult to circumvent than the brick wall. In some embodiments, the enclosed percentage is an estimate of the effectiveness of the combined geographic features associated with a cornering spot. In some embodiments, the enclosed percentage is an estimate of the effectiveness of individual or combined geographic features but is also one aspect of and incorporated into the determination cornering confidence percentage.

As used herein, the term "escape route" refers to a gap, a circuitous path, or one or more mechanisms that would allow one or more members of a crowd contained in a cornering spot to overcome or circumvent a geographic feature that appears to be an effective barrier. The following would be examples of escape routes: an unlocked gate in a fence would constitute and escape route; an exterior door on a building that leads to a hallway and another doorway on the opposite side of the building and exiting outside the cornering spot; or garbage cans stored closed to a wall, providing an easy path to climb over the wall. Escape routes present a difficulty to crowd control resource in that they, in many cases are not obvious and not easily discoverable until after some members of the crowd have escaped from the cornering spot through the escape route.

As used herein, the term "breakable objects" refers to items that can be broken to form a weapon and/or tool for causing damage to property and/or injury to people. In some embodiments, any item or object that can be lifted by a person that can be broken and misused by a person and/or that can be misused by a person wherein such use risks breakage of the object or item. Nonlimiting examples would include, but not be limited to, glass bottles in trash or litter, a wooden picket from a picket fence, and/or shards of glass from a broken window. While breakable objects may or may not constitute property damage contributing to the cost of damage in a damage area, breakable objects have the potential of accelerating and/or aggravating damage to real and/or personal property and/or injury to persons if a crowd having access to such breakable objects were to become violent.

As used herein, the term "damage areas" refers to damage to real and/or personal property and/or bodily injury to people. In some embodiments, damage areas are ranked based on the cumulative cost of such damage, including but not limited to, broken windows on a building (real property), broken windows and slashed tires on a vehicle (personal property), and/or broken bones or other injury requiring medical care expense and/or time lost from work (bodily injury). In some embodiments, a damage area having a cumulative cost exceeding a selected maximum threshold would be considered a maximum damage area or a high damage area, and conversely, a damage area having a cumulative cost below a selected minimum threshold would be considered a minimum damage area or a low damage area. A method for determining damage areas is disclosed in U.S. Ser. No. 17/127,317, the contents of which or fully incorporated herein by reference, wherein a crowd control event herein would be considered an "accident" in such disclosure.

FIG. 1A is a diagram of a system capable of identifying cornering spots suited for controlling a crowd, according to one embodiment. As described above, location-based service providers (e.g., mapping and navigation providers) are continually challenged to provide compelling services and applications. One area of interest relates to developing tools to assist government and other authorities in crowd management. Imagery data, such aerial or satellite imagery, permits passive monitoring of when and where crowd may form, the size of a crowd, and the movement of a crowd. Depending on the motivation behind formation of a crowd, there exists a risk of bodily injuries and/or property damage at the location of a static crowd or along the pathway of a crowd in motion. Accordingly, service providers face significant technical challenges to provide more proactive crowd management.

To address this problem, a system 100 of FIG. 1A introduces a navigation or mapping service that is focused on crowd control issues by having a capability to identify cornering spots with geographic features or properties capable of limiting the escape or movement of crowds. In one embodiment, the system 100 can automatically process images (e.g., via automatic object/feature recognition using computer vision systems or equivalent) of an environment or geographic area to determine or compute factors for classifying particular geographic areas as cornering spots capable of facilitating crowd control. Examples of factors for identifying a cornering spot/location include but are not limited to:

Identification of cornering spots using a combination of aerial/satellite imagery, street-level imagery (such as, but not limited to, imagery collected from street cameras or vehicle-mounted cameras) and optionally other data indicating the presence of crowd control geographic features in a geographic area of interest;

Determination of cornering confidence percentage;

Determination of cornering spot capacity;

Determination of distance from location where crowed initially forms to the cornering spot to which a crowd could be relocated;

Prediction of crowd control resource requirement;

Identification of possible escape routes from a cornering spot;

Identification of breakable objects, which can cause harm to people and/or property in the cornering spots (e.g., angry mob control);

Damage areas (real property, personal property, and/or bodily injury) in the cornering spot and/or on the path from the location where the crowd initially forms to the cornering spot; and Display of recommended or otherwise available cornering spots ranked based on factors such as but not limited to:

Cornering confidence percentage;

Nearest cornering spots from a current location of a crowd that is to be controlled; and Avoidance of areas that may be susceptible to property damage above a threshold damage level.

More specifically, in some embodiments, the system 100 can collect and/or process images 101 to detect a cornering spot 103*a*, wherein the cornering spot 103*a* is an open geographic area that is enclosed, at least in part, by one or more geographic features, such as buildings 105*a* and 105*b*, capable of facilitating crowd control by limiting a mobility of a crowd. In one instance, the system 100 can detect imagery data from images 101 including, but not limited to, satellite imagery date, arial imagery data (collected by aircraft and/or drone), and/or imagery data collected by location-based image sensors (such as street cameras and/or vehicle-mounted cameras), which can be used in live scenarios or stored in an imagery database 109 for reference and use in future events. Such imagery data includes data for geographic features such as, but not limited to, structures, historical monuments/landmarks, buildings, shops, poles, signs, billboards, roads, intersections, sidewalks, fences, water features (lakes, ponds, rivers), hills, ditches, high ground which cannot be easily climbed, railroad tracks, and essentially any physical structure or object that is located in a geographic area.

In some embodiments, cornering spot attributes (e.g., geographic extent, coordinates, associated geographic features and their respective attributes, etc.) are detected by a mapping platform 113 from imagery data 109. The mapping platform 113 can determine cornering spot attributes by processing imagery data using one or more algorithms (e.g., feature recognition and/or object detection algorithms using, for instance, a machine learning system 129 or equivalent as part of a computer vision system). The mapping platform 113 directs storage of the cornering spot attributes in the geographic database 115 (e.g., as a data layer or data records of the geographic database 115) or any other equivalent database. Cornering spot data includes, but is not limited to, corner spot location, corner spot capacity, and/or corner spot confidence percentage. In some embodiments, the geographic database 115 (alone or in combination with any other component of the system 100, such as but not limited to the mapping platform 113), provides cornering spot data as an output from the system 100.

In some embodiments, the mapping platform 113 determines cornering spot attributes including, but not limited to, a cornering confidence percentage, a cornering spot capacity, a distance from a crowd control area (e.g., a current location of a crowd or a location of a crowd that is to be moved towards a cornering spot for crowd control) to the one or more geographic features (such as buildings 105a and 105b), a crowd control resource requirement, cornering spot enclosed percentage, and at least one escape route from a cornering spot, one or more breakable objects related to a cornering spot, and one or more potential damage areas related to a cornering spot.

In some embodiments, the mapping platform 113 uses one or more algorithms to determine the one or more attributes of a cornering spot, such as, but not limited to, cornering confidence percentage and/or a cornering spot capacity, based on imagery data 109 derived from images, including, but not limited to those collected by satellite 111a, aircraft 111b, and/or location-based sensors 111c, such as but not limited to street cameras and/or security cameras. For example, in some embodiments, the mapping platform 113 can use feature or object recognition algorithms (e.g., computer vision algorithms based on the machine learning system 129) to detect features such as but not limited to: (1) the presence of geographic features that are capable of limiting crowd mobility (e.g., buildings, structures, terrain, etc.); (2) characteristics/attributes of the features (e.g., physical size, spatial configuration, material type, gaps, etc.); (3) physical size/configuration/attributes of the open area where a crowd can be held; (4) escape routes; (5) spatial layout between the cornering spot, surrounding geographic features, nearby areas, etc.; and/or the like. Then, the attributes (e.g., cornering confidence percentage, a cornering spot capacity, etc. as listed above) can be computed from the features/objects data detected from the imagery data.

In some embodiments, the mapping platform 113 uses one or more algorithms to determine one or more attributes of a cornering spot further based on information from one or more geographic databases (e.g., geographic database 115), one or more content providers 121, one or more services (123a-123m) on service platform 123, or combinations thereof. In other words, in addition to or as an alternate to the image-based feature/object extraction described above, the mapping platform 113 can extract features for computing the cornering spot attributes from the digital map data of the geographic database 115 or other equivalent databases/services/content providers. For example, the digital map data can include geographic coordinate data, three-dimensional modeling data, etc. on the locations and physical arrangements of the open areas and adjacent geographic features. This data can then be used to compute the cornering spot attributes.

In some embodiments, the cornering confidence percentage of the cornering spot 103a can be based on one or more attributes of the one or more geographic features (such as buildings 105a and 105b), the open geographic area of the cornering spot 103a, or a combination thereof. The cornering confidence percentage indicates a predicted level to which the cornering spot is capable of limiting the mobility of a crowd 117 that has been relocated to a cornering spot 103a and/or limiting the ability of members of the crowd 117 from escaping from the cornering spot 103a. In other words, the cornering confidence percentage is a metric that represents how well a cornering spot is expected to limit the escape or movement of a crowd contained therein. As discussed above, this metric can be based on data such as but not limited to the percentage of a perimeter of the cornering spot enclosed by geographic features, how well the enclosing geographic features limit mobility, and whether the geographic features can be climbed or otherwise bypassed, etc.

In some embodiments, a cornering spot capacity is determined based an area of the open geographic area, a volume of the open geographic area, or a combination thereof. The cornering spot capacity indicates the size of a crowd 117 that can be contained within the cornering spot 103a after the crowd has been relocated into the cornering spot 103a. considering other factors including, but not limited to, nature of the crowd (violent or peaceful), density of the crowd within a given geographic area, weather, time of day, and/or amount of time that the crowd must be contained.

In some embodiments, a distance from a crowd control area to the one or more geographic features (such as buildings 105a and 105b) is determined by the mapping platform 113. A crowd that needs to be controlled will typically not be formed within a cornering spot 103a, much less the most ideal cornering spot, such that a crowd control area initially is location where that crowd originally forms, or crowd formation location. In some embodiments, a crowd formation location is an input into system 100 can use information or data (e.g., stored in or accessible via the geographic database 115) for a determination of distance, wherein the distance calculated is a straight-line distance from the crowd formation location to one or more candidate cornering spots. In some embodiments, system 100 can use information or data (e.g., stored in or accessible via the geographic database 115) to determine one or more distances based on available map routes from the crowd formation location to each candidate cornering spot. In some embodiments, system 100 can further use the information or data (e.g., stored in or accessible via the geographic database 115) for real property, personal property, and/or people to generate one or more routes including potential damage areas on each route from the crowd formation location to each candidate cornering spot. In some embodiments, evaluation of the damage areas on the routes to one or more candidate cornering spots might alter the selection of the best cornering spot based on minimizing the overall cumulative risk and/or cost of damage areas on the route to a cornering spot and the damage area associated with the cornering spot. That is to say, in some instances, a less desirable first cornering spot, based on damage areas in the first cornering spot, may be preferable to a second cornering spot with less and/or lower cost damage areas, because the route to the first cornering spot has less damage areas than the route to the second cornering spot, such that the overall cost and/or risk of damage areas is minimized by selection of the first cornering spot. In one instance, the system 100 can use all this information in the digital channel for predicting/providing minimal/maximum damage area zones to avoid high property damages during crowd control events. In one instance, the system 100 can enable a user (e.g., a municipality, a safety or software engineer, etc.) with the aid of the mapping platform 113 and/or the geographic database 115 or any other equivalent database to build a map use map showing the damage area zones associated with one or more routes to one or more cornering spots to analyze the effect of various road safety precautions (e.g., one-way traffic, no parking, etc.).

In some embodiments, a crowd control resource requirement is determined based on one or more attributes of a cornering spot 103a, such attributes including a cornering confidence percentage of the cornering spot 103a, a cornering spot capacity of the cornering spot 103a, and/or an enclosed percentage of a cornering spot 103a and/or geographic features (such as buildings 105a and 105b). The crowd control resource requirement is an estimate of the amount of resource, such as police, military personnel, and/or other authoritative entity, controlled by the entity desiring to control the crowd, that will be required to relocate the crowd from the crowd formation location and/or to containment of the crowd after it is relocated to the selected cornering spot. The crowd control resource requirement for relocation may be the same or different than the crowd control resource requirement for containment. In some embodiments, crowd control resource requirement could be more refined in considering other factors including, but not limited to, nature of the crowd (violent or peaceful), density of the crowd within a given geographic area, weather, time of day, and/or amount of time that the crowd must be contained. The crowd control resource requirement for containment of a crowd is that amount of crowd control resource required, that in combination with the geographic features associated with a cornering spot, will contain and/or control the crowd within the cornering spot.

In some embodiments, the mapping platform 113 determines cornering spot attributes including, but not limited to, a crowd control resource based on a cornering confidence percentage and/or a cornering spot capacity using one or more algorithms. The machine learning system 129 may be configured to detect certain objects or features depicted in images, and utilize various algorithms (e.g. machine learning algorithms) implemented using various computing architectures. In some implementations, the machine learning system 129 may include one or more neural networks configured to make predictions based on various machine learning models. For example, the machine learning system 129 may include a neural network, such as a convolutional neural network, having multiple layers and neurons. Also, the machine learning system 129 may include receptive fields of a collection of neuron(s) (e.g., a receptive layer) configured to correspond to the area of interest in inputted imagery or data.

In some embodiments, an enclosed percentage of the cornering spot, the one or more geographic features, or a combination thereof, is determined by the mapping platform 113 wherein the enclosed percentage represents the effectiveness of one or more geographic features as barriers to prevent members of the crowd from leaving the open geographic area of the cornering spot using one or more algorithms. The machine learning system 129 may be configured to detect certain objects or features depicted in images, and utilize various algorithms (e.g. machine learning algorithms) implemented using various computing architectures. In some implementations, the machine learning system 129 may include one or more neural networks configured to make predictions based on various machine learning models. For example, the machine learning system 129 may include a neural network, such as a convolutional neural network, having multiple layers and neurons. Also, the machine learning system 129 may include receptive fields of a collection of neuron(s) (e.g., a receptive layer) configured to correspond to the area of interest in inputted imagery or data.

In some embodiments, at least one escape route from the cornering spot is determined by the mapping platform 113 wherein the escape route is a gap, a circuitous path, or one or more mechanisms that would allow one or more members of a crowd contained in a cornering spot to overcome or circumvent a geographic feature that appears to be an effective barrier. In some embodiments, the geographic database 115 (alone or in combination with any other component of the system 100, such as but not limited to the mapping platform 113), provides escape routes as an output from the system 100.

In some embodiments, one or more breakable objects in the cornering spot is determined by the mapping platform 113, wherein breakable objects are items that can cause bodily harm or property damage if such items are available to a violent or out-of-control crowd. In some embodiments, the geographic database 115 (alone or in combination with any other component of the system 100, such as but not limited to the mapping platform 113), provides location of breakable objects as an output from the system 100.

In some embodiments, one or more potential damage areas in the cornering spot, is determined by the mapping platform 113, wherein zone indicates a zone within the geographic area associated with a value of damage to property and/or vehicles and/or injuries to people predicted to result from a violent or out-of-control crowd based on the property cost data.

In some embodiments, corner spot attributes are stored in the geographic database 115 by the mapping platform 113. Corner spot attributes stored in the geographic database include one or more attributes of a cornering spot 103a, wherein the one or more attributes include, but are not limited to, a cornering confidence percentage, a cornering spot capacity, a distance from a crowd control area to the one or more geographic features (such as buildings 105a and 105b), a crowd control resource requirement, cornering spot enclosed percentage, and at least one escape route from a cornering spot, one or more breakable objects related to a cornering spot, and one or more potential damage areas related to a cornering spot.

In some embodiments, output from the system comprises a mapping user interface (UI) application 127. In some embodiments, the mapping user interface application 127 depicts a representation of one or more cornering spots 103a, one or more attributes of the cornering spot, or a combination thereof. In some embodiments, the mapping user interface resides on one or more user equipment 125. In one instance, the UI application 127 may be part of or associated with a routing or a navigation application and can include one or more cornering spots 103a directly on the digital map.

As shown in FIG. 1A, the system 100 comprises a user equipment (UE) 125 having connectivity to (e.g., a mobile device, a smartphone, etc.) having connectivity to the mapping platform 113, geographic database 115, services platform 123, and content providers 121 via the communication network 119. By way of example, the communication network 119 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

The UE 125 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 125 can support any type of interface to the user (such as "wearable" circuitry, etc.).

In some embodiments, a method comprises processing imagery data to detect a cornering spot, wherein the cornering spot is an open geographic area that is enclosed, at least in part, by one or more geographic features capable of facilitating crowd control by limiting a mobility of a crowd.

The method further comprises determining one or more attributes of the cornering spot selected from:
  a. a cornering confidence percentage of the cornering spot based on one or more attributes of the one or more geographic features, the open geographic area, or a combination thereof, indicating a predicted level to which the crowd can be limited from escaping from the cornering spot;
  b. a distance from a crowd control area to the one or more geographic features;
  c. a cornering spot capacity of the cornering spot based an area, a volume, or a combination thereof of the open geographic area, indicating a size of the crowd that can be contained within the cornering spot;
  d. a crowd control resource requirement based on at least one of a cornering confidence percentage of the cornering spot and a cornering spot capacity of the cornering spot;
  e. an enclosed percentage of the one or more geographic features, representing the degree to which a geographic feature is impenetrable;
  f. at least one escape route from the cornering spot;
  g. one or more breakable objects in the cornering spot; and
  h. determining one or more potential damage areas in the cornering spot in which property damage can occur.

One or more of the cornering spot and attributes of the cornering spot is each stored as a data record of a geographic database and provided as output of the geographic database to a mapping user interface depicting a representation of the cornering spot, one or more attributes of the cornering spot, or a combination thereof.

In some embodiments, an apparatus comprises at least one processor and at least one memory, including computer program code for one or more programs. The at least one memory and the computer program code configured to, with the at least one processor, cause the apparatus to process imagery data to detect a cornering spot, which is an open geographic area that is enclosed, at least in part, by one or more geographic features capable of facilitating crowd control by limiting a mobility of a crowd.

The apparatus is further caused to determine one or more attributes of the cornering spot selected from:
  a. a cornering confidence percentage of the cornering spot based on one or more attributes of the one or more geographic features, the open geographic area, or a combination thereof, indicating a predicted level to which the crowd can be limited from escaping from the cornering spot;
  b. a distance from a crowd control area to the one or more geographic features;
  c. a cornering spot capacity of the cornering spot based an area, a volume, or a combination thereof of the open geographic area, indicating a size of the crowd that can be contained within the cornering spot;
  d. a crowd control resource requirement based on at least one of a cornering confidence percentage of the cornering spot and a cornering spot capacity of the cornering spot;
  e. an enclosed percentage of the one or more geographic features, representing the degree to which a geographic feature is impenetrable;
  f. at least one escape route from the cornering spot;
  g. one or more breakable objects in the cornering spot; and
  h. determining one or more potential damage areas in the cornering spot in which property damage can occur.

The apparatus if further caused to store each of one or more of the cornering spot and attributes of the cornering spot as a data record of a geographic database and provide each of the one or more of the cornering spot and attributes of the cornering spot as output of the geographic database to a mapping user interface depicting a representation of the cornering spot, one or more attributes of the cornering spot, or a combination thereof.

In some embodiments, a non-transitory computer-readable storage medium has stored thereon one or more program instructions. When the one or more program instructions are executed by one or more processors, an apparatus is caused to perform the operations of processing imagery data to detect a cornering spot, which is an open geographic area that is enclosed, at least in part, by one or more geographic features capable of facilitating crowd control by limiting a mobility of a crowd.

The non-transitory computer-readable storage medium further causes the apparatus to determine one or more attributes of the cornering spot selected from:
  a. a cornering confidence percentage of the cornering spot based on one or more attributes of the one or more geographic features, the open geographic area, or a combination thereof, indicating a predicted level to which the crowd can be limited from escaping from the cornering spot;
  b. a distance from a crowd control area to the one or more geographic features;

c. a cornering spot capacity of the cornering spot based an area, a volume, or a combination thereof of the open geographic area, indicating a size of the crowd that can be contained within the cornering spot;
d. a crowd control resource requirement based on at least one of a cornering confidence percentage of the cornering spot and a cornering spot capacity of the cornering spot;
e. an enclosed percentage of the one or more geographic features, representing the degree to which a geographic feature is impenetrable;
f. at least one escape route from the cornering spot;
g. one or more breakable objects in the cornering spot; and
h. determining one or more potential damage areas in the cornering spot in which property damage can occur.

The non-transitory computer-readable storage medium further causes the apparatus to store one or more of the cornering spot and attributes of the cornering spot each as a data record of a geographic database and provide the one or more of the cornering spot and attributes of the cornering spot each as output of the geographic database to a mapping user interface depicting a representation of the cornering spot, one or more attributes of the cornering spot, or a combination thereof.

By way of example, the UE 125, mapping platform 113, services platform 123, and content providers 121 communicate with each other and other components of the communication network 119 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In some embodiments, system 100 detects suitable cornering spots from imagery including, but not limited to, imagery collected from aerial, satellite, and street-level imagery. System 100, by way of mapping platform 113 or other means, uses machine learning, deep learning, convolutional neural network ("CNN") training, and/or image recognition technology to detect these cornering spots suitable for various crowd control scenarios based on analysis of imagery including, but not limited to, imagery collected from aerial, satellite and street-level imagery.

In some embodiments, system 100, through mapping platform 113 or other means, uses near distance feature processing aspects and/or other aspects of one or more geographical information systems ("GIS") to generate the nearest building distance which can be used for generating cornering confidence percentage. Exemplary GIS systems include, but are not limited to, commercial products such as Google Earth, which is distributed by Google Inc. of Mountain View, California, and ESRI ArcView, ArcGIS Spatial Analyst, ESRI ArcGIS Network Analyst, ESRI ArcView Network Analyst, and Arc2Earth, which are distributed by ESRI, Inc. of Redlands, California. Exemplary GIS systems also include open-source GIS, such as Quantum Geographic Information System ("QGIS"), which provides certain GIS functions, such as 2D viewing of map layers (e.g., graphical representations of similar objects or concepts that may be exclusive of objects or concepts in other map layers, such as jurisdictional border lines, roads, places of interest, landmarks, etc.) and standard-definition ("SD") maps, basic management of GIS data, and publishing of SD geospatial data.

In some embodiments, system 100, through mapping platform 113 or other means, collects and/or analyzes imagery and/or data from geographical database 115 to generate an enclosed percentage of selected or all geographic features, such as buildings 105*a* and 105*b*, in the geographic region of interest. Geographic features for which data can be collected and/or analyzed include, but are not limited to, structures, historical monuments/landmarks, buildings, shops, poles, signs, billboards, roads, intersections, sidewalks, fences, water features (lakes, ponds, rivers), hills, ditches, high ground which cannot be easily climbed, railroad tracks, and essentially any physical structure or non-transitory object that is located in a geographic area. The enclosed percentage of each geographic feature, such as buildings 105*a* and 105*b*, analyzed is stored as an attribute of each such geographic feature in the geographic database 115 and save in their attributes.

In some embodiments, the enclosed percentage attribute data for one or more geographic features, such as buildings 105*a* and 105*b*, is retrieved from geographic feature data stored in the geographic database 115 or by other storage means and used directly to detects one or more cornering spots and/or one or more attributes of one or more cornering spots.

In some embodiments, system 100 detects cornering spot capacity using an area and/or volumetric formula for calculating cornering spot capacity based on imagery including, but not limited to, imagery collected from aerial, satellite, and street-level imagery. Accuracy of cornering spot capacity can be enhanced using analysis of street view references in combination with overhead imagery such as, but not limited to, aerial and/or satellite imagery. System 100, by way of mapping platform 113 or other means, uses machine learning, deep learning, CNN training, and/or image recognition technology to detect these cornering spot capacity or open space availability of one or more cornering spots.

In some embodiments, system 100, through mapping platform 113 or other means, uses near distance feature processing aspects and/or other aspects of one or more geographical information systems ("GIS") to generate cornering spot capacity based on an area/volumetric formula. Exemplary GIS systems include, but are not limited to, commercial products such as Google Earth, which is distributed by Google Inc. of Mountain View, California, and ESRI ArcView, ArcGIS Spatial Analyst, ESRI ArcGIS Network Analyst, ESRI ArcView Network Analyst, and Arc2Earth, which are distributed by ESRI, Inc. of Redlands, California. Exemplary GIS systems also include open-source GIS, such as Quantum Geographic Information System ("QGIS"), which provides certain GIS functions, such as 2D viewing of map layers (e.g., graphical representations of similar objects or concepts that may be exclusive of objects or concepts in other map layers, such as jurisdictional border lines, roads, places of interest, landmarks, etc.) and SD maps, basic management of GIS data, and publishing of SD geospatial data.

In some embodiments, system 100 can generate a crowd control resource requirement based on the cornering confidence percentage and cornering spot crowd capacity and/or crowd size. A greater crowd size and/or capacity at the same cornering confidence percentage would require more crowd control resource, while a greater cornering confidence percentage at the same crowd size and/or capacity would require less crowd control resource. In some embodiments, system 100 can generate a crowd control resource requirement based on the cornering confidence percentage and cornering spot crowd size, then we will generate the resource requirements for one or more cornering spots within a distance from a point of reference, such as a location where a crowd has or might be formed, wherein the distance is less than a selected threshold value.

In some embodiments, cornering spots are displayed directly in a mapping application 127, such as on a user equipment 125 device. In some embodiments, cornering spots stored in the geographic database 115 and retrieved by the mapping platform 113 for display in a mapping application 127, such as on a user equipment 125 device. In some embodiments, the display of the cornering spots is organized to identify and/or classify cornering spots based on selected factors such as attributes of the one or more cornering spots, including, but not limited to, distance from a crowd control area (i.e. a location where a crowd has or might be formed), cornering confidence percentage, and/or damage area zones (i.e. classification of areas based on the predicted risk and/or predicted cost of damage to property and/or vehicles and/or injury to people (i.e. members of the crowd, members of the crowd control resource, and/or innocent bystanders).

FIGS. 1B-1E show nonlimiting diagrams of exemplary cornering spot scenarios and some of their related attributes, which are summarized in Table 1, below:

spot 103b having a lower cornering confidence percentage, a higher cornering spot capacity, a medium building enclosed percentage, a higher crowd control resource requirement, and a lower damage area.

Figure 1D:
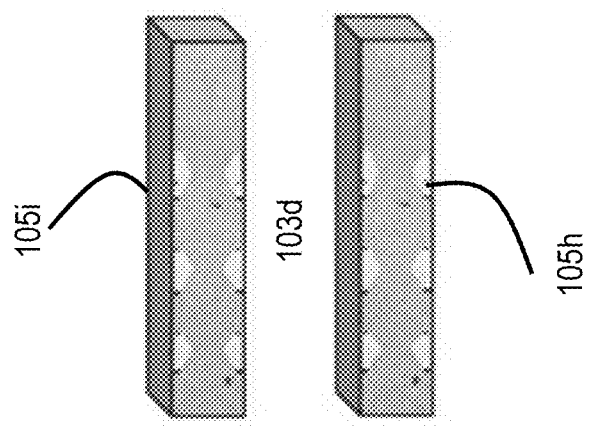
Figure 1C:
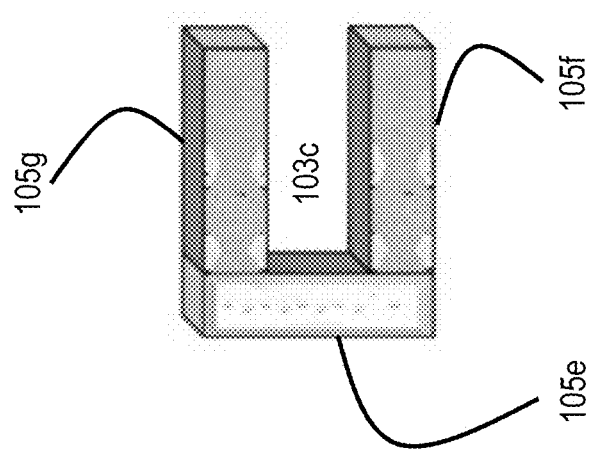

FIG. 1C shows a diagram of geographic features, buildings 105e, 105f, and 105g, in relation to cornering spot 103c. In this embodiment, relative to the configurations in FIGS. 1B and 1D-1F, the "C" configuration of buildings results a cornering spot 103c having a higher cornering confidence percentage, a lower cornering spot capacity, a higher building enclosed percentage, a lower crowd control resource requirement, and a medium damage area.

FIG. 1D shows a diagram of geographic features, buildings 105h and 105i, in relation to cornering spot 103d. In this embodiment, relative to the configurations in FIGS. 1B, 1C, 1E, and 1F, the "parallel" configuration of buildings results a cornering spot 103d having a medium cornering confidence percentage, a medium cornering spot capacity, a lower building enclosed percentage, a medium crowd control resource requirement, and a higher damage area.

Figure 1B:
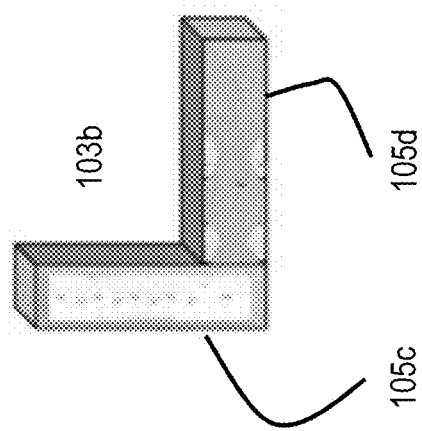
Figure 1E:
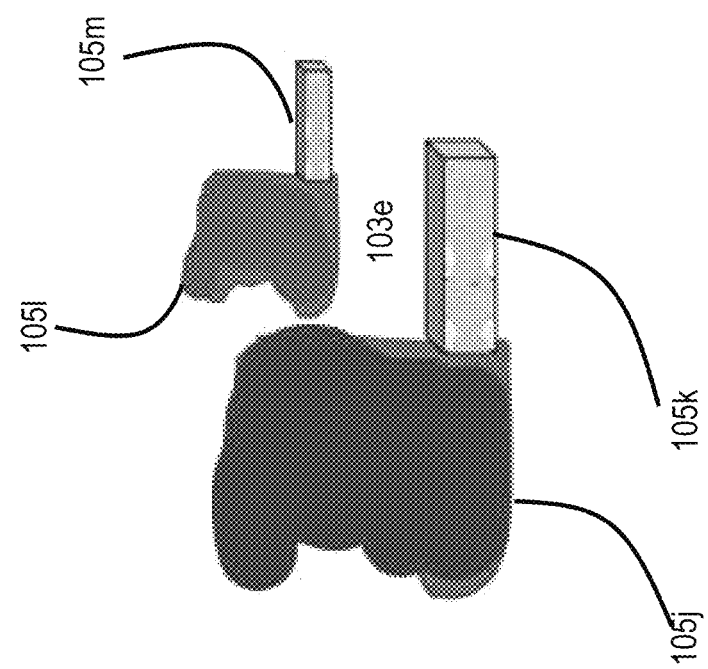

FIG. 1E shows a diagram of geographic features, lake 105j, building 105k, hilly terrain zone 105l, and building 105m, in relation to cornering spot 103e. In this embodiment, relative to the configurations in FIGS. 1B-1D and 1F, the mixed configuration of two buildings, a lake, and hilly terrain results a cornering spot 103d having a lower cornering confidence percentage, a higher cornering spot capacity, a medium building enclosed percentage, a higher crowd control resource requirement, and a lower damage area.

Figure 1F:
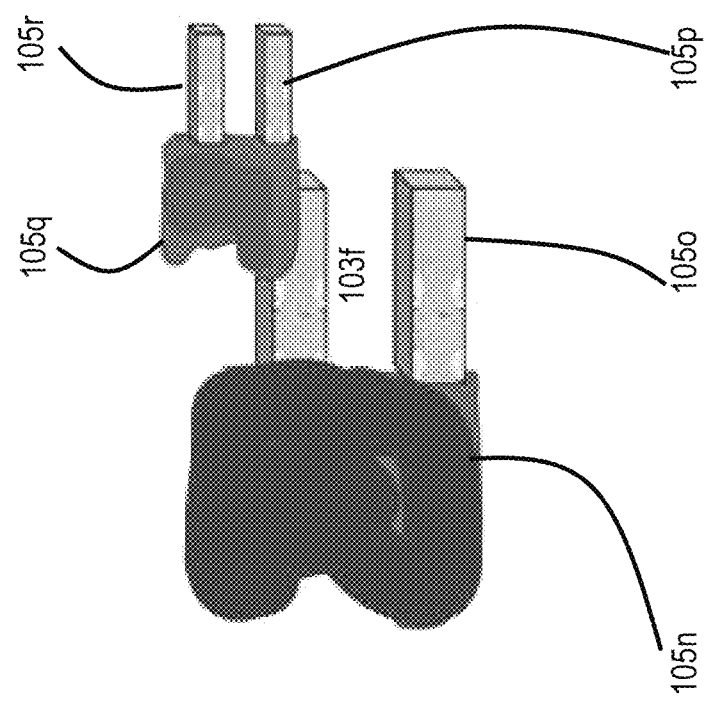

FIG. 1F shows a diagram of geographic features, lake 105n, building 105o, building 105p, hilly terrain zone 105q, and building 105r, in relation to cornering spot 103f. In this embodiment, relative to the configurations in FIGS. 1A-1E, the mixed configuration of four buildings, a lake, and hilly terrain results a cornering spot 103d having a higher cornering confidence percentage, a medium cornering spot capacity, a higher building enclosed percentage, a lower crowd control resource requirement, and a medium damage area.

The embodiments in FIGS. 1B-1F are illustrative for relative comparisons while absolute values of attributes of actual geographic features would require much more data and many more dimension that can be discussed herein. In some embodiments, imagery data derived from imagery, such as, but not limited to, aerial, satellite, and/or street-level imagery, optionally in combination with data related to geographic features in the geographic region of interest would be used to detect potential cornering spots. The geometrical and other characterizing data relevant to a

TABLE 1

| Cornering Spot Attribute | FIG. 1B | FIG. 1C | FIG. 1D | FIG. 1E | FIG. 1F |
| --- | --- | --- | --- | --- | --- |
| Cornering Confidence Percentage | ~25% | ~75% | ~50% | ~25% | ~75% |
| Cornering Spot Capacity | ~100+ | ~50-80 | ~80-100 | ~100+ | ~50-80 |
| Building Enclosed Percentage | ~50% | ~75% | ~25% | ~50% | ~75% |
| Crowd Control Resource | ~20 | ~5-7 | ~10-14 | ~20 | ~5-7 |
| Damage Area | Low | Medium | High | Low | Medium |

FIG. 1B shows a diagram of geographic features, buildings 105c and 105d, in relation to cornering spot 103b. In this embodiment, relative to the configurations in FIGS. 1C-1F, the "L" configuration of buildings results a cornering potential cornering spot are analyzed in the mapping platform 113 to determine the suitability of a potential cornering spot based on one or more predetermined criteria such as, but not limited to:

a. the capability of a potential cornering spot to trap, corner, or otherwise limit the mobility of a crowd (i.e. cornering confidence percentage);
b. the suitability of a potential cornering spot for containment of a crowd of a predetermined size;
c. the distance to selected geographic features, such as, but not limited to, buildings, water features, and/or hilly terrain zones;
d. the desirability of a potential cornering spot for containment of a crowd based to the risk and/or value of damage to property and/or vehicles and/or injury to people, including members of the crowd, members of the crowd control resource, and/or innocent bystanders; and
e. the availability of crowd control resources proximate to the location of the potential cornering spot.

Determination of whether of potential cornering spot satisfies some of the above criteria is more straightforward than others. For instance, the second criterion, related to size of the cornering spot, and the third criterion, related to distance to selected geographic features, require less analysis than the other criteria. The cornering confidence percentage requires evaluation of the building enclosed percentage. The building enclosed percentage means the percentage of the perimeter of the cornering spot the is closed or covered by a building wall. The criterion of the availability of crowd control resource is obtained from the police and/or the governmental entities relevant to the geographical region of interest.

FIGS. 1G-1L show a simplified determination of cornering confidence percentage based on exemplary configurations of geographic features.

FIG. 1G shows geographic features, buildings 105s and 105t, in a "L" configuration where two adjacent sides are closed or covered and two adjacent sides are open. This configuration yields a cornering confidence percentage of 50%, based on closed portion of the perimeter of cornering spot 103g, indicated by the solid line 106a and open portion of the perimeter of cornering spot 103g, indicated by dashed line 108a, and assumes a building structural shape using shape-enclosed side details or a building enclosed percentage of 100%.

FIG. 1H show a geographic feature, building 105u, in a single building configuration where only one side is closed or covered and the remaining three sides are open. This configuration yields a cornering confidence percentage of 25%, based on closed portion of the perimeter of cornering spot 103h, indicated by the solid line 106b and open portion of the perimeter of cornering spot 103h, indicated by dashed line 108b, and assumes a building structural shape using shape-enclosed side details or a building enclosed percentage of 100%.

FIG. 1I shows geographic features, buildings 105v, 105w, and 105x, in a "C" configuration where three adjacent sides are closed or covered and the remaining side is open. This configuration yields a cornering confidence percentage of 75%, based on closed portion of the perimeter of cornering spot 103i, indicated by the solid line 106c and open portion of the perimeter of cornering spot 103i, indicated by dashed line 108c, and assumes a building structural shape using shape-enclosed side details or a building enclosed percentage of 100%.

FIG. 1J shows geographic features, adjacent buildings 105y and 105z, and lake 105aa, adjacent to building 105z, in a "C" configuration where three adjacent sides are closed or covered and the remaining side is open. This configuration yields a cornering confidence percentage of 75%, based on closed portion of the perimeter of cornering spot 103j, indicated by the solid lines 106d, 106e, and 106f, and open portion of the perimeter of cornering spot 103j, indicated by dashed line 108d, and assumes a building structural shape using shape-enclosed side details or a building enclosed percentage and closure or coverage effectiveness of the lake of 100%.

FIG. 1K shows geographic features, building 105bb and non-adjacent lake 105cc, where opposite sides are closed or covered and the remaining opposite sides are open. This configuration yields a cornering confidence percentage of 50%, based on closed portion of the perimeter of cornering spot 103k, indicated by the solid lines 106g and 106h, and open portion of the perimeter of cornering spot 103k, indicated by dashed lines 108e and 108f, and assumes a building structural shape using shape-enclosed side details or a building enclosed percentage and closure or coverage effectiveness of the lake of 100%.

FIG. 1L shows geographic features, adjacent buildings 105dd, 105ee, and 105ff and adjacent lake 105gg, where all sides are closed or covered. This configuration yields a cornering confidence percentage of 100%, based on closed portion of the perimeter of cornering spot 103l, indicated by the solid lines 106i, 106j, 106k, and 106l, and assumes a building structural shape using shape-enclosed side details or a building enclosed percentage and closure or coverage effectiveness of the lake of 100%.

Figure 2:
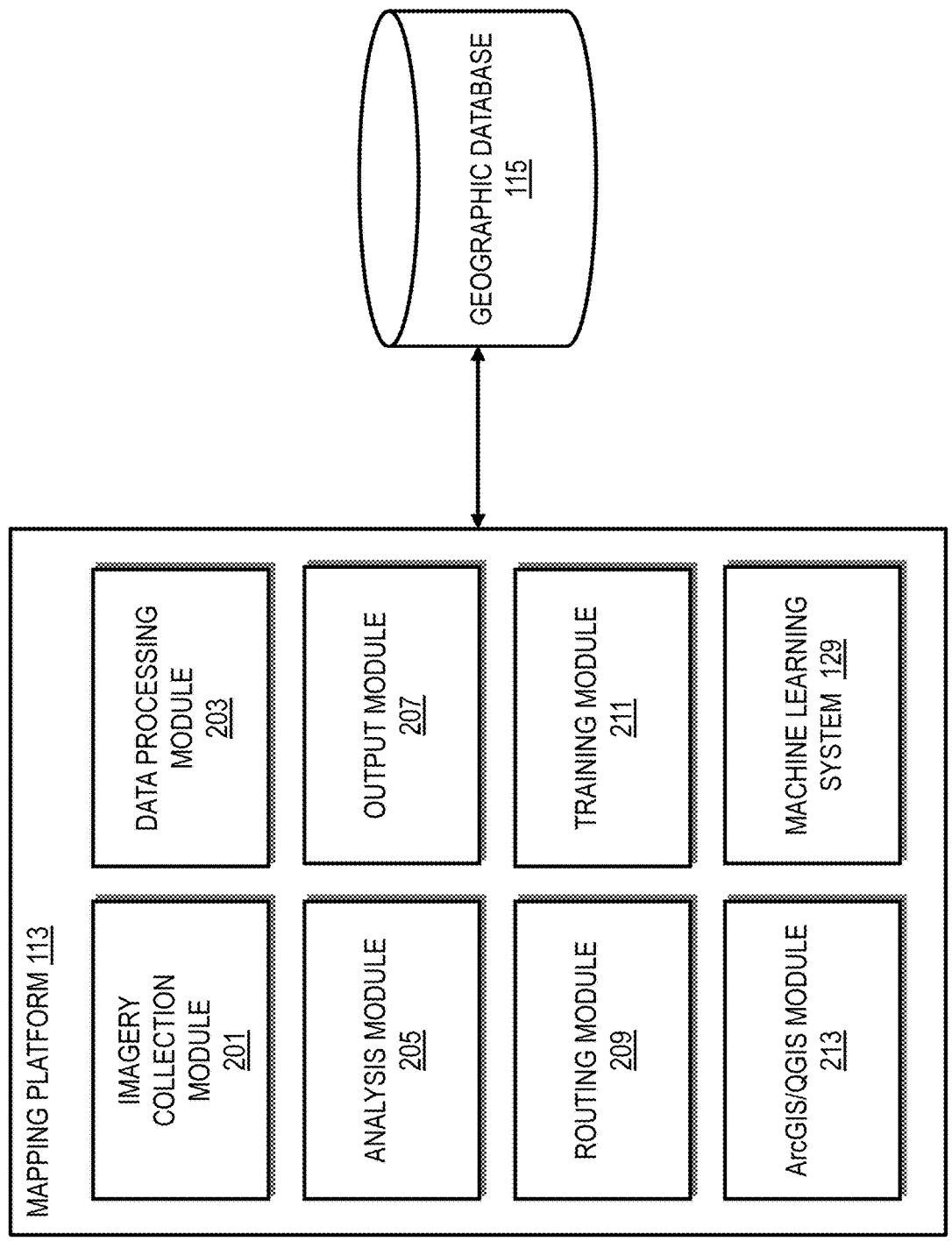
FIG. 2 is a diagram of the components of a mapping platform capable of identifying cornering spots suited for controlling a crowd, according to one embodiment.

FIG. 2 is a diagram of the components of a diagram of the mapping platform 113, according to some embodiments. By way of example, the mapping platform 113 includes one or more components for processing imagery data to detect at least one cornering spot, wherein the cornering spot is an open geographic area that is enclosed, at least in part, by one or more geographic features capable of facilitating crowd control by limiting a mobility of a crowd; according to the example embodiment(s) described herein. It is contemplated that the functions of these components may be combined in one or more components or performed by other components of equivalent functionality. In this embodiment, the mapping platform 113 includes an imagery collection module 201, a data processing module 203, an analysis module 205, an output module 207, a routing module 209, a training module 211, an ArcGIS/QGIS module 213, and the machine learning system 129, and has connectivity to the geographic database 115. The above presented modules and components of the mapping platform 113 can be implemented in hardware, firmware, software, or a combination thereof. Though depicted as a separate entity in FIG. 1A, it is contemplated that the mapping platform 113 may be implemented as a module of any other component of the system 100. In another embodiment, the mapping platform 113, the machine learning system 129, and/or the modules 201-213 may be implemented as a cloud-based service, local service, native application, or combination thereof. The functions of the mapping platform 113, the machine learning system 129, and/or the modules 201-213 are discussed with respect to FIG. 3.

Figure 3:
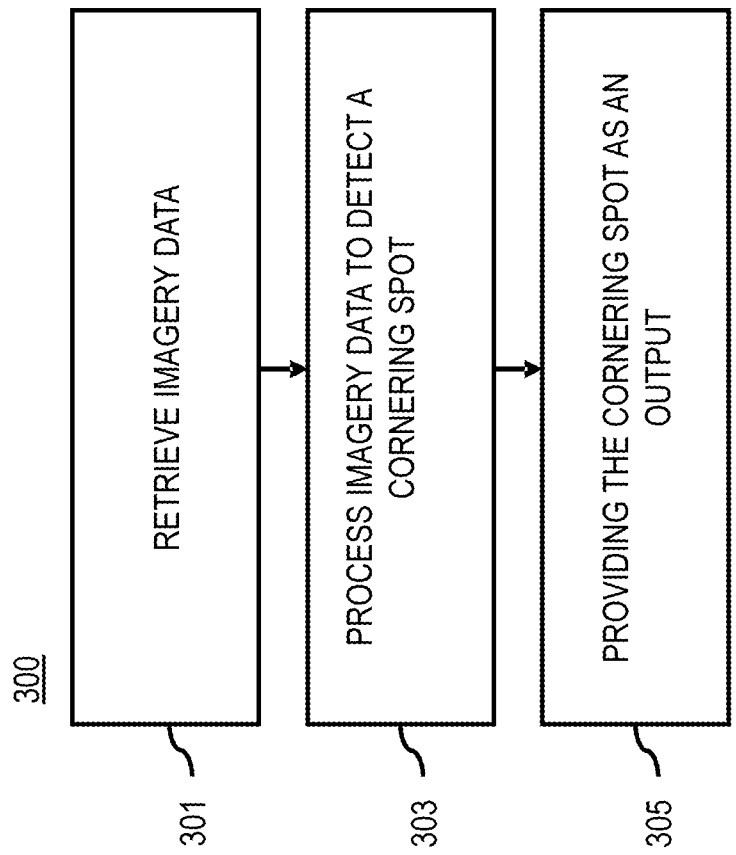
FIG. 3 is a flowchart of a process for capable of identifying cornering spots suited for controlling a crowd, according to one embodiment.
Figure 7:
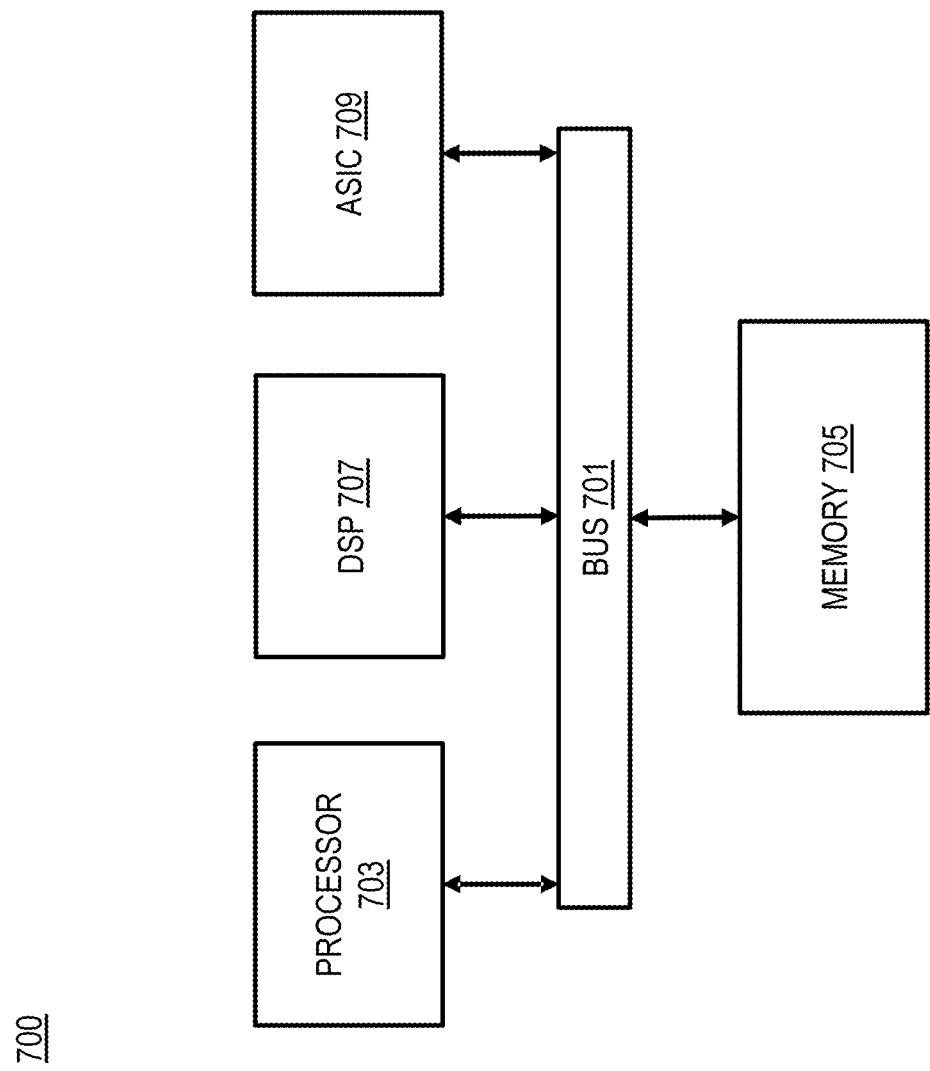
FIG. 7 is a diagram of a chip set that can be used to implement an embodiment.

FIG. 3 is a flowchart of a process for collecting and/or processing images 101 to detect a cornering spot 103a, wherein the cornering spot 103a is an open geographic area that is enclosed, at least in part, by one or more geographic features, such as buildings 105a and 105b, capable of facilitating crowd control by limiting a mobility of a crowd, according to some embodiments. In various embodiments, the mapping platform 113, the machine learning system 129, and/or any of the modules 201-213 may perform one or more portions of the process 300 and may be implemented in, for instance, a chip set including a processor and a memory as shown in FIG. 7. As such, the mapping platform 113, the machine learning system 129, and/or the modules 201-213 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all the illustrated steps.

In step 301, the imagery collection module 201 collects images 101 and data processing module 203 processes imagery data 109. Images 101 and imagery data 109 are processed by collection module 201 and/or data processing module 203 to detect one or more geographic features, such as buildings 105a and 105b, for identification of potential cornering spots 103a. Data processing module 203 further retrieves available data related to one or more detected geographic features from the geographic database 115, wherein such data related to detected geographic features may be relevant to determining cornering spot attributes relevant to use of the one or more detected geographic features in the formation of a potential cornering spot.

By way of example, the images 101 may be collected from one or more known methods for determining one or more geographic features from imagery including, but not limited to, imagery collected from aerial 111b, satellite 111a, and street-level cameras 111c. The mapping platform 113 includes means, such as the imagery collection module 201, the data processing module 203, and/or the analysis module 205, in some embodiments, for receiving information regarding a plurality of geographic features, such as buildings 105a and 105b, and further information on such geographic features, such as from the geographic database 115, to develop three-dimensional representations of the buildings. The representations of the plurality of geographic features, such as buildings 105a and 105b, for which information is received include information, including, but not limited to, detailed information regarding windows, doorways, and materials of construction. Representations of other geographic features include, but are not limited to: depth of water for lakes; width, depth, and height of hills in hilly terrain; height, materials of construction, and location of gates for fences. Suc representations would be a basis for further processing by one of more of the imagery collection module 201, the data processing module 203, and/or the analysis module 205, to determine physical attributes of one or more cornering spots, such attributes including, but not limited to, cornering spot percentage, cornering spot capacity, enclosed percentage, shape of geographic open area, crowd control resource requirement, escape routes, breakable objects, and/or damage areas.

In step 303, data output from imagery collection module 201 and/or data processing module 203 are analyzed to determine one or more attributes of each potential cornering spot 103a wherein the one or more attributes of selected from cornering confidence percentage, distance from a crowd control area, cornering spot capacity, crowd control resource requirement, enclosed percentage of the one or more geographic features, at least one escape route, one or more breakable objects, and one or more potential damage areas. Based on output from one or more of imagery collection module 201, data processing module 203, and analysis module 205, output module 207 sends to and/or stores cornering spots and cornering spot attributes in the geographic database 115 and application 127 on user equipment 125. Based on output from one or more of imagery collection module 201, data processing module 203, analysis module 205, and output module 207 routing module 209 identifies one or more pathways for relocating a crowd 117 from a location where a crowd has or might be formed to a potential cornering spot 103a.

In step 305, data output from imagery collection module 201, data processing module 203, analysis module 205, and routing module 209 are sent by the output module 209 to and application 127 on the UE 125 and/or the geographic database 109.

In one instance, the machine learning system 129 can improve the machine learning models using feedback loops based on, for example, the statistical comparison of predicted cornering confidence percentage, cornering spot capacity, cornering spot distance, building enclosed percentage, at least one escape route, one or more breakable objects, and one or more potential damage areas as compared to results of actual crowd control events.

In some embodiments, the training data can include ground truth data taken from historical records of actual crowd control events (e.g., provided by multiple news sources covering such events, property damage records, hospital records of injuries, etc.). For instance, in a data mining process, features are mapped by training module 211 to ground truth reports of how well and where crowds were controlled or not controlled to form a training instance. A plurality of training instances can form the training data for the machine learning system 129 using one or more machine learning algorithms (e.g., random forest, decision trees, etc.). For instance, the training data can be split into a training set and a test set (e.g., at a ratio of 7:3). After evaluating several machine learning models based on the training set and the test set, the machine learning model that produces the highest classification accuracy in training and testing can be used by the machine learning system 129 as the cornering confidence percentage prediction machine learning model.

In some embodiments, ArcGIS/QGIS module 213 uses near distance feature processing aspects and/or other aspects of one or more GIS systems to generate the nearest building distance which can be used for generating cornering confidence percentage.

FIGS. 4A through 4C are diagrams of example user interfaces for predicting damage area zones for a vehicle to avoid in case of an accident, according to example embodiment(s). In some embodiments, the system 100 can generate a user interface (UI) 401 for a vehicle 101 (e.g., an autonomous vehicle), a UE 115 (e.g., a mobile device, a smartphone, etc.), or a combination thereof (e.g., an embedded navigation system) that can enable a user (e.g., a driver or a passenger of a vehicle 101, a vehicle 101 fleet manager, etc.) to minimize potential damage costs in the event of an accident involving a vehicle 101. In one instance, the UI 401 may be part of or associated with a routing or a navigation application 123 and can include one or more minimum/maximum damage areas displayed directly on the digital map 113.

Referring to FIG. 4A ("Cornering Spot Identification"), in one example use case, a user is a representative or member of the police, the military, and or a government entity with jurisdiction over crowd control events. The use has received at alert regarding formation of a crowd of a certain size at a specific location. The user activates the cornering spot application 127a and is provided prompts (not shown) for entry of crowd size and location of crowd. The user receives a display 401 on user equipment (UE) 125a of a geographic region relevant to the crowd location provided as input to the application 127a. In this example, buildings are highlighted in different colors based on ranges of values of cornering confidence percentages: green for 76-100%, red for 51-75%, yellow for 26-50%, and blue for 1-25%. Actual colors are not shown due to patent office rules, but the red category is highlighted in a box having a black outline and labeled as cornering spot 103m for discussion herein. Map buildings are highlighted in based on in this example based on cornering confidence percentage but can optionally be filtered on one or more other cornering spot attributes such as, but not limited to crowd capacity, damage areas, and distance.

Referring to FIG. 4B ("Cornering Spot Ranking"), shows the content of another available display 403 in the application 127a on UE 125a. In this example, system 100 generates information to display color key to correlate colors to numerical ranges. This example is illustrated by the black outline around cornering spot 103m and the cornering percentage color code for the cornering percentage in the range of from 51% to 75% (shown as ~75%). In some embodiments, these ranges can be adjusted by user inputs to obtain a more granular display of the first identified ranges. For instance, if no cornering spots are identified in the 76% to 100% range (shown as ~100%), the user can request similar color coding to multiple subranges between 51% and 75%.

Referring to FIG. 4C ("Cornering Spot Attributes"), shows the content of another available display 405 in the application 127a on UE 125a. In this example, system 100 generates information to display one or more attributes of a selected cornering spot 103m. In this example, the display shows cornering confidence percentage, cornering spot capacity, damages areas, and distance attributes of selected cornering spot 103m.

Figure 5:
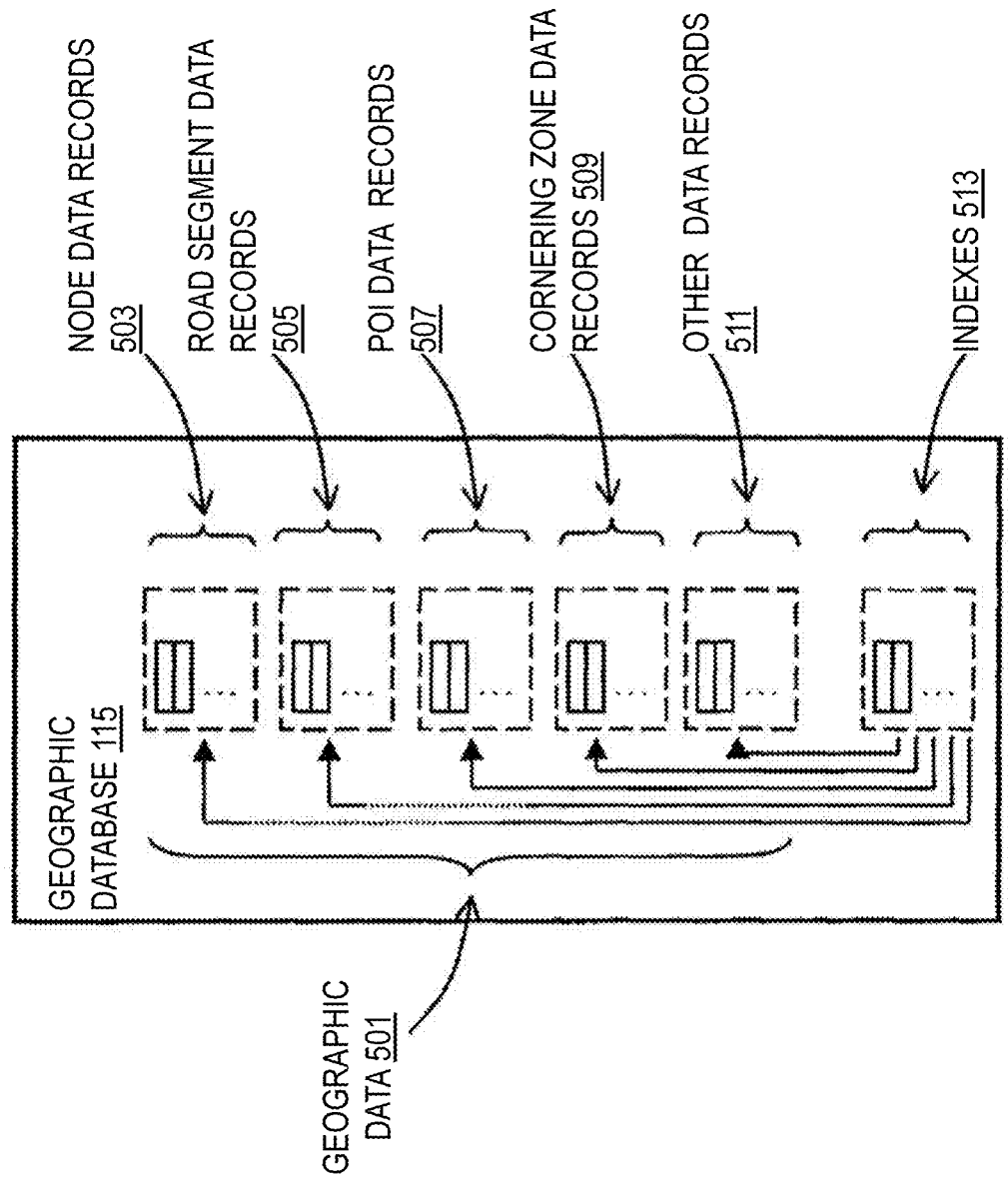
FIG. 5 is a diagram of a geographic database that can be used to implement an embodiment.

FIG. 5 is a diagram of a geographic database (e.g., the geographic database 109), according to example embodiment(s). In one embodiment, the geographic database 109 includes geographic data 501 used for (or configured to be compiled to be used for) predicting one or more cornering spots and/or one or more attributes of one or more cornering spots. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more-line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon (e.g., a hexagon) is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links (e.g., links 111) do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 109 includes node data records 503, road segment or link data records 505, POI data records 507, cornering spot data records 509, other records 511, and indexes 513, for example. More, fewer, or different data records can be provided. In one embodiment, additional data records (not shown) can include cartographic ("carto") data records, routing data, and maneuver data. In one embodiment, the indexes 513 may improve the speed of data retrieval operations in the geographic database 109. In one embodiment, the indexes 513 may be used to quickly locate data without having to search every row in the geographic database 109 every time it is accessed. For example, in one embodiment, the indexes 513 can be a spatial index of the polygon points associated with stored feature polygons.

In exemplary embodiments, the road segment data records 505 are links or segments representing roads (e.g., roads or links), streets, or paths (e.g., that are unique to an area) that can be used for predicting damage area zones for property, vehicles, people, or a combination thereof located on or near the roads or the links of an area (e.g., as represented by the digital map). The node data records 503 are end points corresponding to the respective links or segments of the road segment data records 505. The road link data records 505 and the node data records 503 represent a road network, such as used by vehicles 101 and/or other entities. Alternatively, the geographic database 109 can contain path segment and node data records or other data that represent pedestrian paths or areas in addition to or instead of the vehicle road record data, for example.

The road/link segments and nodes can be associated with attributes, such as geographic coordinates, street names, address ranges, average property costs, speed limits, turn restrictions at intersections, and other navigation related attributes, as well as POIs, such as a restaurant, a retail shop, an office, etc. The geographic database 109 can include data about the POIs and their respective locations in the POI data records 507. In one embodiment, the POI data records 507 can include population density data (e.g., foot traffic), hours of operation, popularity or preference data, prices, ratings, reviews, and various other attributes. The geographic database 109 can also include data about places, such as cities, towns, or other communities, and other geographic features, such as bodies of water, mountain ranges, etc. Such place or feature data can be part of the POI data records 507 or can be associated with POIs or POI data records 507 (such as a data point used for displaying or representing a portion of a city).

In one embodiment, the geographic database 109 includes cornering spot data records 509 including property cost information as well as building material information for the properties in a given area (e.g., properties located on a road or a link); vehicle cost information as well as vehicle strength and vehicle durability information for the vehicles in a given area (e.g., driving, stopped, or parked on a road or a link); people cost information (e.g., based on actuarial tables) as well as individual property cost information (e.g., mobile devices, shared scooters, etc.) for the people in a given area (e.g., pedestrians, occupants of a property or a vehicle, etc.). In one instance, the cornering spot data records 509 can also include maximum and minimum threshold values (e.g., based on historic averages, means, etc.). In one instance, the cornering spot data records 509 can include both the predicted costs and the actual costs based on a subsequent accident involving a vehicle 101 that the machine learning system 129 can use for training and testing purposes (e.g., in connection with the training module 211 of the mapping platform 113). In one instance, the cornering spot data records 509 can include rankings, probabilities, weights or weighting schemes, labeled and/or marked features and attributes, and/or any other related data. In one embodiment, the cornering spot data records 509 can be associated with one or more of the node data records 503, road segment or link records 505, and/or POI data records 507; or portions thereof (e.g., smaller or different segments than indicated in the road segment records 505) to predict damage area zones for a vehicle to avoid in case of an accident.

In one embodiment, the geographic database 109 can be maintained by the services platform 127 (e.g., a map developer). The map developer can collect human movement data to generate and enhance the geographic database 109. There can be different ways used by the map developer to collect data. These ways can include obtaining data from other sources, such as municipalities or respective authorities (e.g., city real estate records, vehicle registration records, etc.). In addition, the map developer can employ field personnel to travel by a vehicle (e.g., an autonomous or semi-autonomous vehicle) along a road or a link throughout an area of interest (e.g., the digital map) to observe and/or record information regarding the properties, vehicles, and/or people in the area. Similarly, the map developer can employ field personnel to travel by foot throughout an area of interest (e.g., the digital map 113) to observe and/or record information regarding the properties, vehicles, and/or people in the area. Also, remote sensing, such as aerial or satellite photography (e.g., from the satellites), can be used.

In one embodiment, the geographic database 109 include high resolution or high definition (HD) mapping data that provide centimeter-level or better accuracy of geographic features. For example, the geographic database 109 can be based on LiDAR or equivalent technology to collect billions of 3D points and model road surfaces and other geographic features down to the number lanes and their widths. In one embodiment, the HD mapping data capture and store details such as the slope and curvature of the road, lane markings, roadside objects such as signposts, including what the signage denotes. By way of example, the HD mapping data enable highly automated vehicles 101 to precisely localize themselves on a road, and to determine the road attributes (e.g., direction of traffic) at high accuracy levels.

In one embodiment, the geographic database 109 is stored as a hierarchical or multi-level tile-based projection or structure. More specifically, in one embodiment, the geographic database 109 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101, a vehicle sensor 107, a UE 115, a device sensor 117, and/or an application 123. The navigation-related functions can correspond to vehicle navigation (e.g., a drone), pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for detecting cornering spots and determining their respective attributes may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
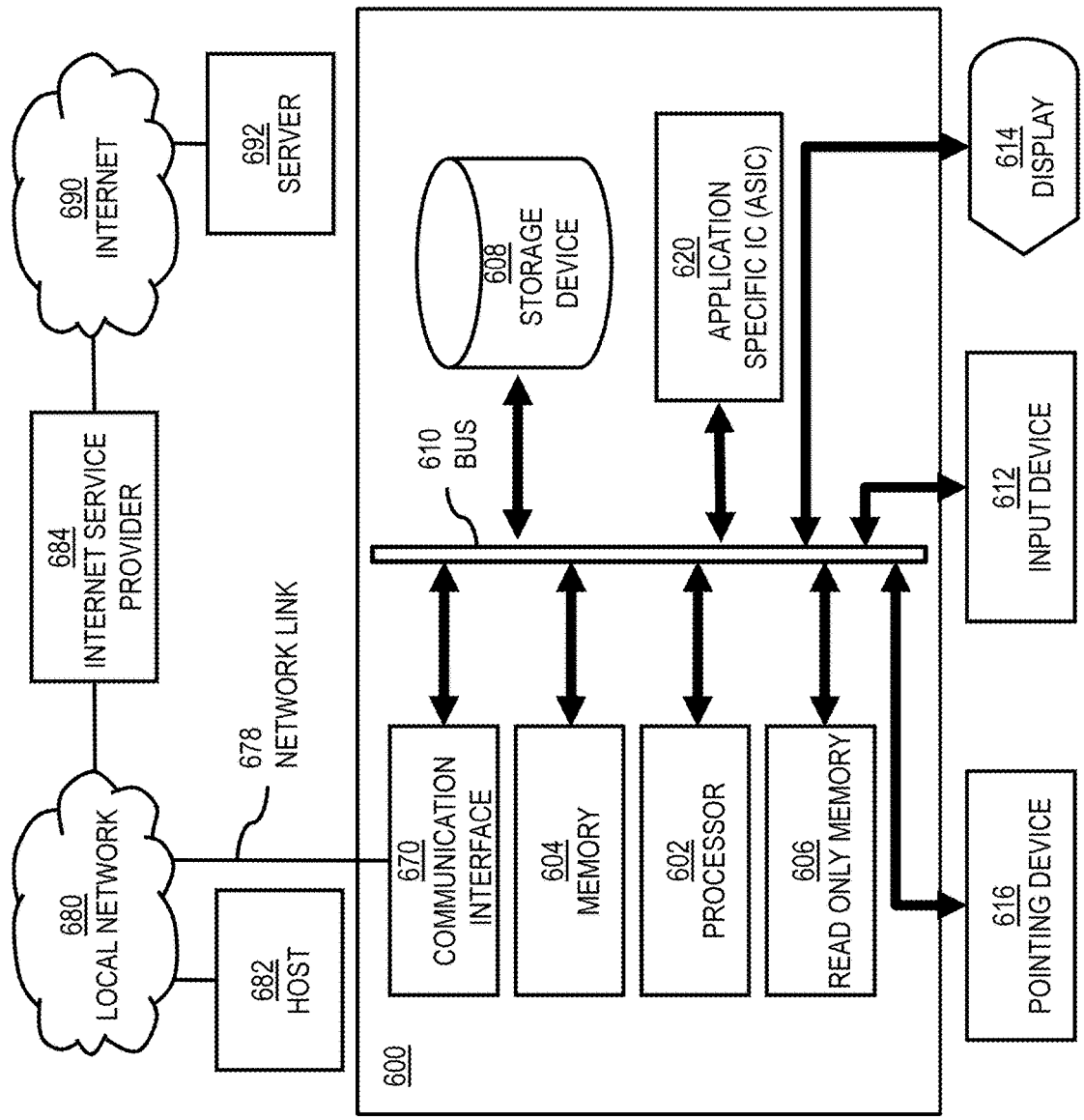
FIG. 6 is a diagram of a computer system that can be used to implement an embodiment.

FIG. 6 illustrates a computer system 600 upon which an embodiment of the invention may be implemented. Computer system 600 is programmed (e.g., via computer program code or instructions) to detect one or more cornering spots and/or one or more attributes of one or more cornering spots as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to detect one or more cornering spots and one or more of their respective attributes. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for detecting cornering spots and/or one or more attributes of one or more cornering spots. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for detecting cornering spots and/or one or more attributes of one or more cornering spots, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general, the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 119 for detecting cornering spots and/or one or more attributes of one or more cornering spots to the UE 125.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system can be deployed in various configurations within other computer systems, e.g., host 682 and server 692.

FIG. 7 illustrates a chip set 700 upon which an embodiment of the invention may be implemented. Chip set 700 is programmed to detect one or more cornering spots and/or one or more attributes of one or more cornering spots as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to detect one or more cornering spots and/or one or more attributes of one or more cornering spots.

The memory 705 also stores the data associated with or generated by the execution of the inventive steps.

FIG. 8 is a diagram of exemplary components of a mobile terminal (e.g., handset) capable of operating in the system of FIG. 1A, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions that offer automatic contact matching. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile station 801 to detect one or more cornering spots and/or one or more attributes of one or more cornering spots. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 851 may be, but not limited to, a single memory, CD, DVD, ROM, RAM, EEPROM, optical storage, or any other non-volatile or non-transitory storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
processing imagery data to detect a cornering spot, wherein the cornering spot is an open geographic area that is enclosed, at least in part, by one or more geographic features capable of facilitating crowd control by limiting a mobility of a crowd;
storing the cornering spot as a data record of a geographic database; and
providing the cornering spot as an output of the geographic database.

2. The method of claim 1, further comprising:
determining a cornering confidence percentage of the cornering spot based on one or more attributes of the one or more geographic features, the open geographic area, or a combination thereof, wherein the cornering confidence percentage indicates a predicted level to which the crowd can be limited from escaping from the cornering spot; and
storing the cornering confidence percentage as an attribute of the cornering spot in the geographic database.

3. The method of claim 2, wherein the one or more attributes include a distance from a crowd control area to the one or more geographic features.

4. The method of claim 1, further comprising:
determining a cornering spot capacity of the cornering spot based an area, a volume, or a combination thereof of the open geographic area, wherein the cornering spot capacity indicates a size of the crowd that can be contained within the cornering spot; and
storing the cornering spot capacity as an attribute of the cornering spot in the geographic database.

5. The method of claim 1, further comprising:
determining a crowd control resource requirement based on at least one of:
a cornering confidence percentage of the cornering spot; and
a cornering spot capacity of the cornering spot.

6. The method of claim 1, further comprising:
determining an enclosed percentage of the cornering spot, the one or more geographic features, or a combination thereof, wherein the enclosed percentage represents a percentage of a perimeter of the cornering spot enclosed by the one or more geographic features; and
storing the enclosed percentage as an attribute of the cornering spot, the one or more geographic features, or a combination thereof in the geographic database.

7. The method of claim 1, further comprising:
determining at least one escape route from the cornering spot; and
storing the at least one escape route as an attribute of the cornering spot in the geographic database.

8. The method of claim 1, further comprising:
determining one or more breakable objects in the cornering spot; and
storing the one or more breakable objects as an attribute of the cornering spot in the geographic database.

9. The method of claim 1, further comprising:
determining one or more potential damage areas in the cornering spot, wherein the one or more potential damage areas are areas in which property damage can occur; and
storing the one or more potential damage areas as an attribute of the cornering spot in the geographic database.

10. The method of claim 1, wherein the output comprises a mapping user interface depicting a representation of the cornering spot, one or more attributes of the cornering spot, or a combination thereof.

11. A apparatus comprising:
at least one processor; and
at least one memory including computer program code for one or more programs, the at least one memory and the computer program code configured to, with the at least one processor, cause the apparatus to perform at least the following operations:
process imagery data to detect a cornering spot, wherein the cornering spot is an open geographic area that is enclosed, at least in part, by one or more geographic features capable of facilitating crowd control by limiting a mobility of a crowd;
store the cornering spot as a data record of a geographic database; and
provide the cornering spot as an output of the geographic database.

12. The apparatus of claim 11, wherein the apparatus is further caused to perform the following operations:
determine a cornering confidence percentage of the cornering spot based on one or more attributes of the one or more geographic features, the open geographic area, or a combination thereof, wherein the cornering confidence percentage indicates a predicted level to which the crowd can be limited from escaping from the cornering spot; and
store the cornering confidence percentage as an attribute of the cornering spot in the geographic database.

13. The apparatus of claim 12, wherein the one or more attributes include a distance from a crowd control area to the one or more geographic features.

14. The apparatus of claim 11, wherein the apparatus is further caused to perform the following operations:
determine a cornering spot capacity of the cornering spot based an area, a volume, or a combination thereof of the open geographic area, wherein the cornering spot capacity indicates a size of the crowd that can be contained within the cornering spot; and
store the cornering spot capacity as an attribute of the cornering spot in the geographic database.

15. The apparatus of claim 11, wherein the apparatus is further caused to perform the following operations:
determine a crowd control resource requirement based on at least one of:
a cornering confidence percentage of the cornering spot; and
a cornering spot capacity of the cornering spot.

16. The apparatus of claim 11, wherein the apparatus is further caused to perform the following operations:
determine an enclosed percentage of the cornering spot, the one or more geographic features, or a combination thereof, wherein the enclosed percentage represents a percentage of a perimeter of the cornering spot enclosed by the one or more geographic features; and
store the enclosed percentage as an attribute of the cornering spot, the one or more geographic features, or a combination thereof in the geographic database.

17. A non-transitory computer-readable storage medium having stored thereon one or more program instructions which, when executed by one or more processors, cause an apparatus to at least perform the following operations:
processing imagery data to detect a cornering spot, wherein the cornering spot is an open geographic area that is enclosed, at least in part, by one or more geographic features capable of facilitating crowd control by limiting a mobility of a crowd;

storing the cornering spot as a data record of a geographic database; and providing the cornering spot as an output of the geographic database.

18. The non-transitory computer-readable storage medium of claim 17, wherein the apparatus is further caused to perform:

determining a cornering confidence percentage of the cornering spot based on one or more attributes of the one or more geographic features, the open geographic area, or a combination thereof, wherein the cornering confidence percentage indicates a predicted level to which the crowd can be limited from escaping from the cornering spot; and storing the cornering confidence percentage as an attribute of the cornering spot in the geographic database.

19. The non-transitory computer-readable storage medium of claim 18, wherein the one or more attributes include a distance from a crowd control area to the one or more geographic features.

20. The non-transitory computer-readable storage medium claim 18, wherein the apparatus is further caused to perform:

determining a cornering spot capacity of the cornering spot based an area, a volume, or a combination thereof of the open geographic area, wherein the cornering spot capacity indicates a size of the crowd that can be contained within the cornering spot; and storing the cornering spot capacity as an attribute of the cornering spot in the geographic database.

\* \* \* \* \*